US009608446B2

(12) United States Patent
Chang et al.

(10) Patent No.: US 9,608,446 B2
(45) Date of Patent: Mar. 28, 2017

(54) METHOD AND APPARATUS FOR CONTROLLING ENERGY SUPPLY

(75) Inventors: Young-Bin Chang, Anyang-si (KR); Geun-Ho Lee, Suwon-si (KR); Rakesh Taori, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 906 days.

(21) Appl. No.: 13/183,887

(22) Filed: Jul. 15, 2011

(65) Prior Publication Data

US 2012/0029721 A1    Feb. 2, 2012

(30) Foreign Application Priority Data

Jul. 30, 2010  (KR) .................. 10-2010-0073825

(51) Int. Cl.
| | | |
|---|---|---|
| *G05D 3/12* | (2006.01) | |
| *G05D 5/00* | (2006.01) | |
| *G05D 9/00* | (2006.01) | |
| *H02J 3/28* | (2006.01) | |

(52) U.S. Cl.
CPC ..................... *H02J 3/28* (2013.01)

(58) Field of Classification Search
CPC ....................................... H02J 3/28
USPC ....................................... 700/297
See application file for complete search history.

(56) References Cited

U.S. PATENT DOCUMENTS

| | | | |
|---|---|---|---|
| 8,423,199 B2* | 4/2013 | Kalen ........................... 700/297 |
| 8,433,453 B2* | 4/2013 | Tsunoda et al. .............. 700/297 |
| 8,478,452 B2* | 7/2013 | Pratt et al. .................... 700/297 |
| 8,489,249 B2* | 7/2013 | Chen ............................. 700/298 |
| 8,515,492 B2* | 8/2013 | Valerdi Rodriguez et al. ............................. 455/561 |
| 2005/0005621 A1* | 1/2005 | Jayadev ................ F24F 11/006 62/230 |
| 2006/0276938 A1* | 12/2006 | Miller .................... G06Q 50/06 700/295 |
| 2007/0255969 A1* | 11/2007 | Theobald ....................... 713/320 |
| 2008/0114499 A1* | 5/2008 | Hakim ..................... H02J 3/32 700/291 |
| 2008/0114811 A1 | 5/2008 | Murdoch |
| 2008/0281663 A1* | 11/2008 | Hakim et al. ..................... 705/8 |
| 2009/0076661 A1 | 3/2009 | Pearson et al. |
| 2009/0326724 A1* | 12/2009 | Lasseter et al. ............. 700/287 |
| 2011/0021248 A1* | 1/2011 | Valerdi Rodriquez et al. ............................. 455/561 |
| 2011/0040418 A1* | 2/2011 | Kalen .................... F03D 9/007 700/291 |
| 2011/0060474 A1* | 3/2011 | Schmiegel et al. .......... 700/291 |
| 2011/0218693 A1* | 9/2011 | Tsunoda et al. ............. 700/297 |

FOREIGN PATENT DOCUMENTS

| | | |
|---|---|---|
| DE | 10 2008 037 574 A1 | 7/2010 |
| EP | 1 202 425 A2 | 5/2002 |

(Continued)

*Primary Examiner* — Ziaul Karim
(74) *Attorney, Agent, or Firm* — Jefferson IP Law, LLP

(57) ABSTRACT

A method and apparatus for controlling energy supply to energy consuming devices are provided. The method includes acquiring a first amount of energy to be used in at least one energy consuming device, determining the amount of energy stored in an energy storage, and optionally transmitting an energy supply request message to an energy supplier based on the amount of energy to be consumed in an energy consuming device and the amount of stored energy.

22 Claims, 18 Drawing Sheets

(56) References Cited

FOREIGN PATENT DOCUMENTS

| | | | |
|---|---|---|---|
| JP | 2006-288014 A | 10/2006 | |
| JP | 2006288014 A * | 10/2006 | |
| KR | 10-1998-0058216 A | 9/1998 | |
| KR | 10-2010-0061453 A | 6/2010 | |
| KR | 10-0964449 B1 | 6/2010 | |
| WO | WO 2009092587 A1 * | 7/2009 | ............ F03D 9/02 |
| WO | 2010/042550 A2 | 4/2010 | |

\* cited by examiner

METHOD AND APPARATUS FOR CONTROLLING ENERGY SUPPLY

PRIORITY

This application claims the benefit under 35 U.S.C. §119(a) of a Korean Patent Application filed in the Korean Intellectual Property Office on Jul. 30, 2010 and assigned Serial No. 10-2010-0073825, the entire disclosure of which is hereby incorporated by reference.

BACKGROUND OF THE INVENTION

1. Field of the Invention

The present invention relates to a method and apparatus for controlling energy supply.

2. Description of the Related Art

Houses and buildings consuming energy such as electricity, water, gas, and heat, may use the energy in various different forms. For example, energy consuming devices in a specific house may not be the same in terms of the amount of energy and forms of energy use by time (or time-specific energy use). Among the total energy use, the amount of energy used in a specific region during the day may be often concentrated at certain times. An energy supplier may supply energy to cover a maximum amount of energy use at a specific time, and may also generate additional energy by taking into account unexpected additional demands. An operator of the energy supplier may increase production and management facilities of the energy supplier by taking into account the maximum amount of energy use.

Research on energy supply is required by taking into account a depletion of energy or energy sources, the costs of energy production and use, and environmental issues for the energy production.

SUMMARY OF THE INVENTION

Aspects of the present invention are to address at least the above-mentioned problems and/or disadvantages and to provide at least the advantages described below. Accordingly, an aspect of the present invention is to provide a method and apparatus for more efficiently supplying energy to be used in an energy consuming device.

In accordance with an aspect of the present invention, a method for controlling energy supply is provided. The method includes acquiring a first amount of energy to be used in at least one energy consuming device, determining a second amount of energy stored in an energy storage, and optionally transmitting an energy supply request message to an energy supplier based on the first amount of energy and the second amount of energy.

In accordance with another aspect of the present invention, an apparatus for controlling energy supply to at least one energy consuming device is provided. The apparatus includes an energy detector for determining a second amount of energy stored in an energy storage, a controller for acquiring a first amount of energy to be used in the at least one energy consuming device, and for controlling a transceiver to optionally transmit an energy supply request message to an energy supplier based on the first amount of energy and the second amount of energy, and the transceiver for transmitting the energy supply request message to the energy supplier.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
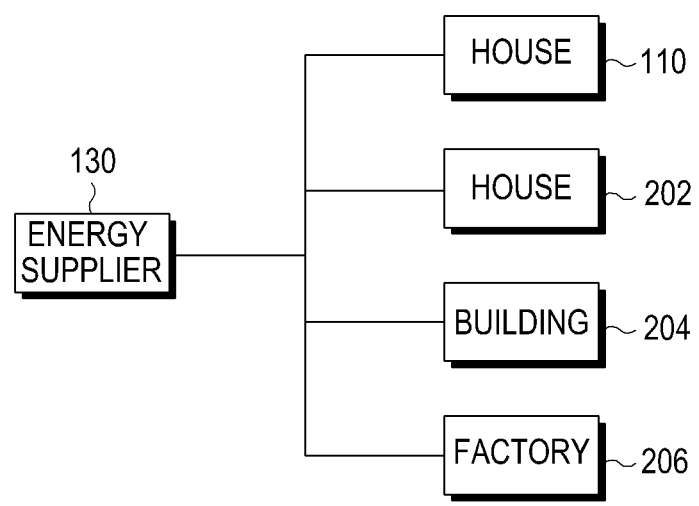
FIG. 1 is a diagram illustrating an energy supply system according to an exemplary embodiment of the present invention.

FIG. 1 illustrates an energy supply system according to an exemplary embodiment of the present invention.

Referring to FIG. 1, the energy supply system according to an exemplary embodiment of the present invention may include an energy supplier 130, a house 110, a house 202, a building 204, and a factory 206. The energy supplied, used, and/or controlled in the energy supply system may include electricity, water, gas, and heat. The energy supplier 130 may be a supply entity supplying energy to each of the house 110, the house 202, the building 204, and the factory 206. For example, the energy supplier 130 may be an electric company or a regional energy supply. The house 110 may include an energy supply control apparatus (hereinafter referred to as a 'control device') according to an exemplary embodiment of the present invention. Likewise, each of the building 204 and the factory 206 may include its own control device. Energy consuming entities having energy consuming devices, such as buildings, may also include their own control devices. The house 202 may be a conventional house without a control device. Although not illustrated, the energy supply system according to an exemplary embodiment of the present invention may include a conventional building and/or factory without a control device.

Figure 2:
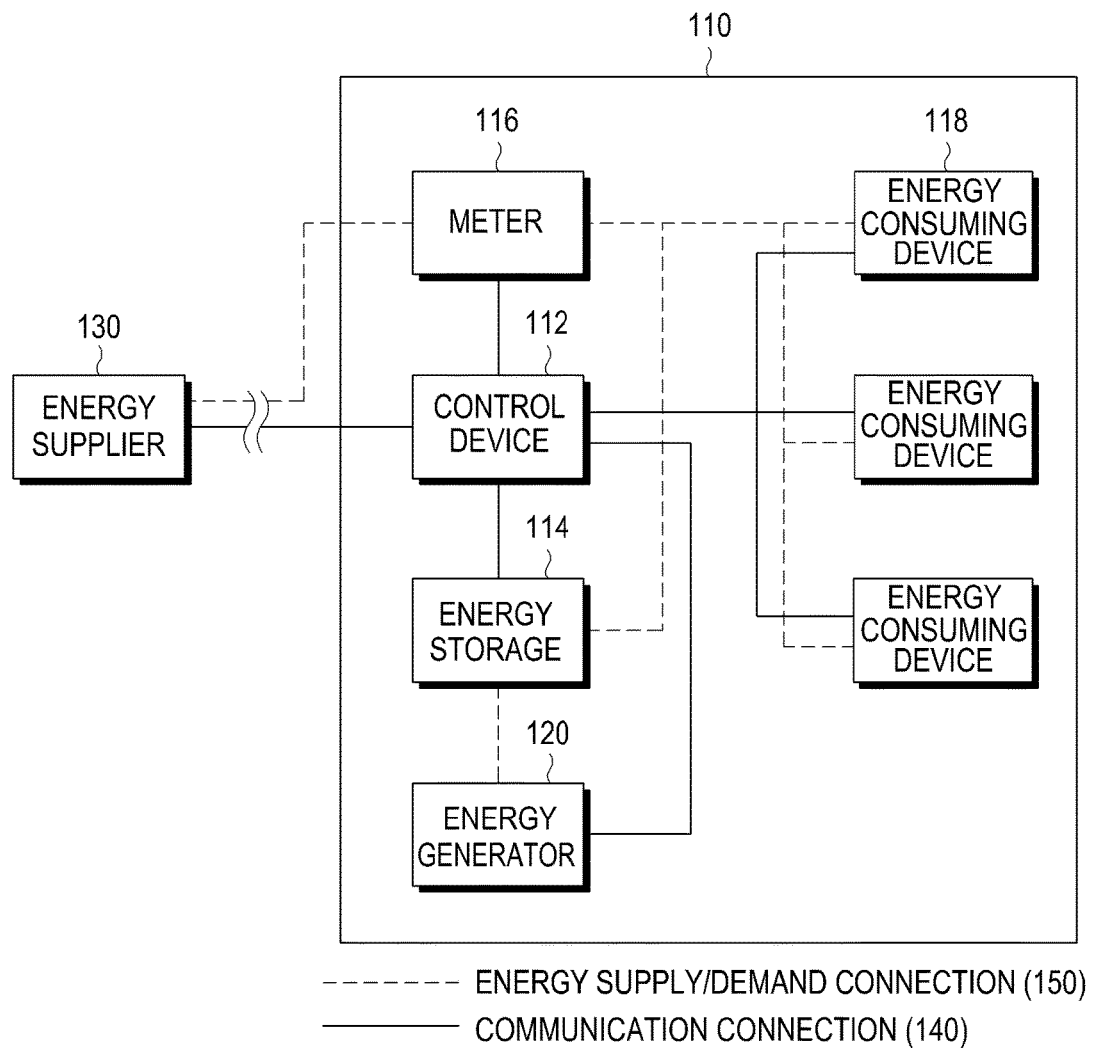
FIG. 2 is a diagram illustrating a connection between an energy supplier and a house in an energy supply system according to an exemplary embodiment of the present invention.

FIG. 2 illustrates a connection between an energy supplier and a house in an energy supply system according to an exemplary embodiment of the present invention.

Referring to FIG. 2, the connection between the energy supplier 130 and the house 110 may include a communication connection 140 represented by a solid line, and an energy supply/demand connection 150 represented by a dashed line. The communication connection 140 may be implemented by wire or wireless, and the wire/wireless connection may be realized in various different forms. For example, the communication connection 140 between a control device 112 and energy consuming devices 118 may be implemented by Wireless-Fidelity (WiFi), ZigBee, World Interoperability for Microwave (WiMAX), 3rd Generation Partnership Project Long-Term Evolution (3GPP LTE), and/or other specific standards, or may be implemented by powerline communication. Alternatively, the communication connection 140 between the control device 112 and the energy consuming devices 118 may be implemented through agreements on input/output types of application programs or control programs of the control device 112 and the energy consuming devices 118, without being limited to the specific communication. A medium and an energy supply/demand scheme for the energy supply/demand connection 150 may be determined depending on the type of energy. For example, if the energy supply/demand connection 150 represents an electrical connection, a connection between the energy supplier 130 and a meter 116, a connection between the meter 116 and an energy storage 114, and a connection between the meter 116 and the energy consuming devices 118 may be connections via power lines.

The house 110 may include the control device 112, the energy storage 114, and the energy consuming devices 118. The house 110 may further include the meter 116 and an energy generator 120. In an exemplary implementation, the control device 112 and the meter 116 may be implemented as a single device. Although the configuration of the house 110 will be described herein by way of example, it will be understood by those of ordinary skill in the art that this configuration may be applied in a similar way to other energy consuming entities, for example, the building 204 and the factory 206 illustrated in FIG. 1. The house 202 may include components similar to those of the house 110, except for the control device 112 illustrated in FIG. 2.

The energy consuming devices 118 may transmit energy demand information to the control device 112 or the meter 116. The energy demand information may be energy demands of the energy consuming devices 118, or information needed to acquire energy demands of the energy consuming devices 118. The energy demands may be an amount of energy that will be consumed in the energy consuming devices 118 for a preset time period (for example, operating times of the energy consuming devices 118). The energy demand information may include at least one of a number of operations of the energy consuming devices 118, operating times thereof, the amount of energy to be consumed, the amount of energy consumed per hour, and a maximum delay time required for the completion of operations. For example, if an energy consuming device 118 is a washing machine, the washing machine may transmit, to the control device 112, energy demand information including a maximum delay time required for the completion of its washing operation, and the operating time required for washing.

The meter 116 may detect the amount of energy supplied/demanded. For example, the meter 116 may detect the amount of energy supplied from the energy supplier 130 to the energy consuming devices 118. The meter 116 may detect the amount of energy that is sold to the energy supplier 130 by the energy storage 114. The meter 116 may control a flow of the energy supplied by the energy supplier 130 or sold to the energy supplier 130 to be continued or blocked. The meter 116 may control the energy flow by receiving a control signal from the control device 112. The meter 116 may detect the amount of energy consumed per hour for each of the energy consuming devices 118, or the amount of energy consumed in real time in each of the energy consuming devices 118. For example, the meter 116 may detect power used by the energy consuming devices 118, or the amount of power thereof.

The energy storage 114 may store the energy supplied from the energy generator 120 or the energy supplier 130. The energy storage 114 may supply the stored energy to the energy consuming devices 118 and/or the energy supplier 130 under control of the control device 112. The energy storage 114 may report the amount of stored energy through the control device 112 and the communication connection 140. In this case, the energy storage 114 may be one of energy consuming devices because it consumes energy necessary for communication and needed to detect the amount of energy. For example, the energy storage 114 may be a device capable of charging and discharging electric energy.

The energy generator 120 may be a device that generates energy using solar cells, solar heat, subterranean heat, rainwater collection, waterpower, wind power, and the like. Research and development on generation and use of green energy has been conducted in various different ways. Therefore, the energy generator 120 may include devices which have already been commercialized to generate energy, and devices that will be available in the future.

The control device 112 may control energy supply to the energy consuming devices 118. The control device 112 may acquire the amount of energy to be used in at least one of the energy consuming devices 118. For example, the amount of energy to be used may be a sum of the amount of operating energy and the amount of energy corresponding to the energy demands of the energy consuming devices 118. The amount of energy corresponding to the energy demands may be the amount of energy to be used in the energy consuming devices 118 for their preset time periods. The amount of operating energy may include the amount of energy required for communication with the energy consuming devices 118.

The amount of energy corresponding to the energy demands may include at least one of the amount of energy to be consumed, which is acquired based on the energy demand information received from the energy consuming devices 118, the amount of energy for energy consuming devices that cannot transmit energy demand information, and the amount of energy for energy consuming devices that operate nonstop. In an exemplary implementation, the amount of operating energy may be 0. The amount of energy corresponding to the energy demands may be acquired by the control device 112 based on the amount of energy to be consumed for a preset time period, included in the energy demand information received from the energy consuming devices 118, or may be acquired based on the amount of energy consumed per hour and the operating time information, included in the energy demand information.

The control device 112 may acquire energy demands based on the amount of energy consumed per hour for the energy consuming devices 118, received through the meter 116, and on the operating times of the energy consuming devices 118, included in the energy demand information received from the energy consuming devices 118. For example, the control device 112 may acquire the amount of energy to be used in the energy consuming devices 118, if the control device 112 receives, from the meter 116, information indicating that power consumed per hour in the energy consuming devices 118 is 200 W, and receives, from the energy consuming devices 118, energy demand information indicating that their operating times are 2 hours.

The amount of energy to be used in the energy consuming devices 118 may represent the amount of energy, which will be used in the energy consuming devices 118 for a preset time period. The preset time period may be a time period from a first time to the maximum delay time required for the completion of operations of the energy consuming devices 118, a specific time period preset in the control device 112, or a specific unit time. The first time may be a time the control device 112 determined the energy demands, a time the control device 112 received the energy demand information, or the current time. The preset time period may be a time period corresponding to a specific energy supply scheme, and the time period may adaptively vary according to the energy supply scheme.

The control device 112 may determine the amount of energy stored in the energy storage 114. The control device 112 may transmit an energy amount request to the energy storage 114, and receive an energy amount response from the energy storage 114 in response to the energy amount request. The control device 112 may transmit the energy amount request upon receiving energy demand information from the energy consuming devices 118, or may periodically transmit the energy amount request at regular intervals. Alternatively, the energy storage 114 may periodically transmit information about the amount of stored energy to the control device 112 without the energy amount request from the control device 112, or may transmit information about the amount of stored energy to the control device 112 depending on an event that occurs when the amount of stored energy reaches a preset level. The communication connection 140 between the control device 112 and the energy storage 114 may include a scheme in which the control device 112 unilaterally detects the amount of energy stored in the energy storage 114.

The control device 112 may optionally transmit an energy supply request to the energy supplier 130 based on the amount of energy to be used in the energy consuming devices 118 and the amount of energy stored in the energy storage 114. The energy supply request may include information about the amount of requested energy, which is determined based on at least one of a preset amount of energy, the amount of energy to be used, and the amount of stored energy. If a value determined by subtracting the amount of stored energy from the amount of required energy is greater than 0, the amount of requested energy may be greater than or equal to a difference between the amount of required energy and the amount of stored energy. The amount of required energy is a sum of the preset amount of energy and the amount of energy to be used. On the other hand, if a value determined by subtracting the amount of stored energy from the amount of required energy is less than or equal to 0, the amount of requested energy may be less than or equal to a difference between the amount of required energy and the amount of stored energy. The energy supply request including information about the amount of requested energy may further include information about the sale of the stored energy. If the value determined by subtracting the amount of stored energy from the amount of required energy is less than or equal to 0, the control device 112 may omit transmitting the energy supply request.

The preset amount of energy may refer to the minimum amount of energy that should be stored in the energy storage 114 at a preset time. The preset amount of energy, the minimum amount of energy that is required to be stored at specific timing, may be received from users along with information about the specific timing, or may be set in the control device 112 by a manufacturer or an operator. The energy supply request may be periodically transmitted along with the information about the time period for which energy will be supplied, or the information about the amount of energy which will be supplied at regular intervals.

The control device 112 may receive, from a user, information about the target amount of energy, indicating the amount of energy that is required to be stored in the energy storage 114 at specific timing, making it possible to more conveniently control energy supply depending on the user situation. The control device 112 may determine whether to transmit an energy supply request, based on the amount of energy to be used, the amount of stored energy, and the target amount of energy. If the amount of required energy indicates a sum of the preset amount of energy and the amount of energy to be used, the preset amount of energy may be the target amount of energy.

The control device 112 may control the amount of energy stored in the energy storage 114 at specific timing to be greater than or equal to the preset amount of energy. If the amount of stored energy is less than the amount of energy to be used, the control device 112 may acquire a time period for which it will be supplied energy from the energy supplier 130, based on time-specific energy costs. The control device 112 may transmit an energy supply request to the energy supplier 130 so that energy can be supplied from the energy supplier 130 to the energy storage 114 in the time period for which it will be supplied energy. The control device 112 may acquire the time-specific energy costs from the energy supplier 130 or the meter 116. Alternatively, the time-specific energy costs may be data that is preset in the control device 112, or may be data that is acquired from a time-specific energy cost management server (not illustrated) over a communication network.

Based on the time-specific energy costs, the control device 112 may select a scheme of supplying energy to the energy consuming devices 118 and/or the energy storage 114, scheduling the time for which it will supply energy. For example, based on the time-specific energy costs, the control device 112 may transmit an energy supply request so that energy may be supplied from the energy supplier 130 to the energy storage 114 and/or the energy consuming devices 118 at the time in which the energy costs are relatively lower.

The energy supplier 130 may receive an energy supply request from the control device 112. The energy supplier 130 may transmit the time-specific energy costs to the control device 112 and/or the meter 116 by taking into account the energy use. Upon receiving the energy supply request, the energy supplier 130 may control production and supply of energy by determining the amount of energy used by energy consuming entities including the house 110. The energy supplier 130 may induce the energy consuming entities to change their energy consumption time by estimating the amount of energy use and setting the time-specific energy costs. Therefore, the energy supply system according to an exemplary embodiment of the present invention may reduce a maximum amount of energy use at specific timing and/or distribute the energy use by estimating the time-specific energy use, thereby improving the efficiency of energy use.

The time-specific energy costs may include information about past, present and future energy costs. The energy supplier 130 may provide the control device 112 with information about the time-specific energy costs including the future energy costs. The control device 112 may determine information about the future energy costs depending on a preset scheme (e.g., an average value) for the past or present energy costs.

Figure 3:
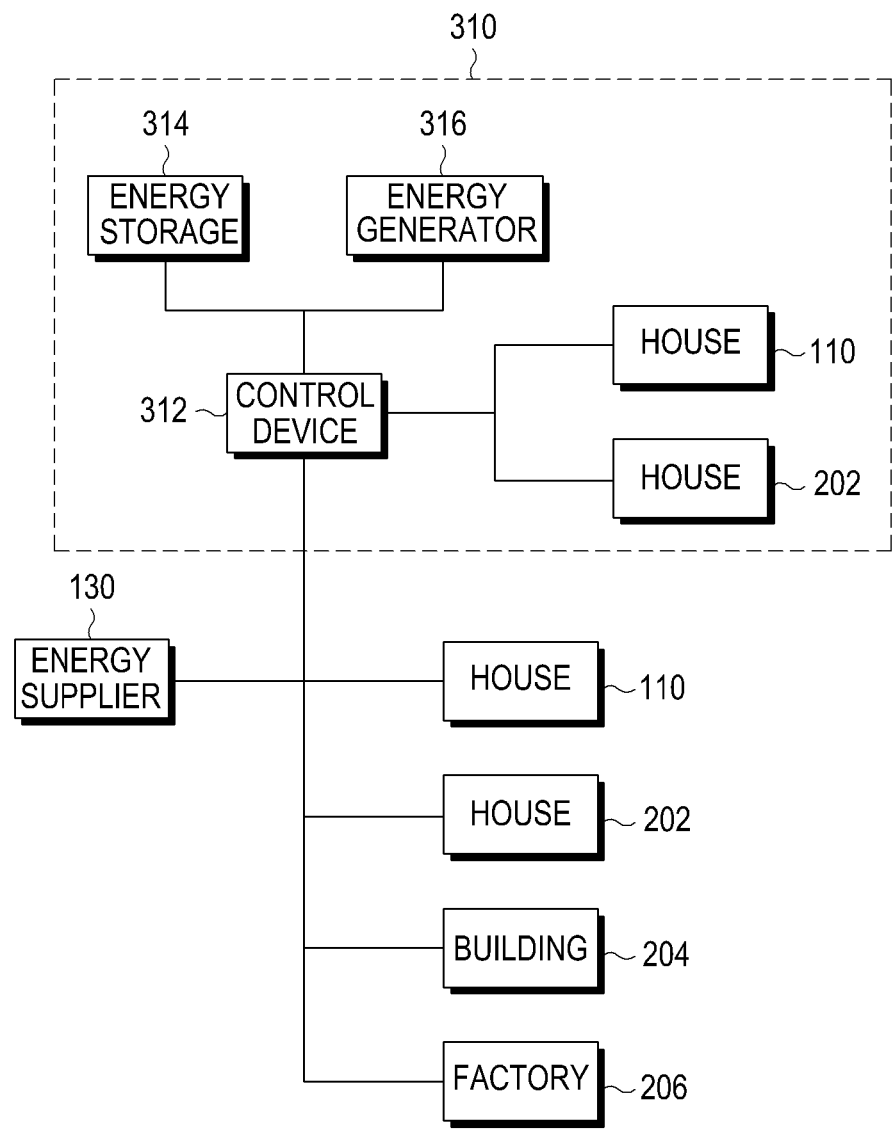
FIG. 3 is a diagram illustrating an energy supply system according to an exemplary embodiment of the present invention.

FIG. 3 illustrates an energy supply system according to an exemplary embodiment of the present invention.

Referring to FIG. 3, the energy supply system may further include an apartment 310. The energy supplier 130, the house 110, the house 202, the building 204, and the factory 206 may be replaced by the energy supply system described in FIGS. 1 and 2. The apartment 310 may include a separate control device 312 different from the control device 112 in the house 110. The apartment 310 may include an energy storage 314 and an energy generator 316. The apartment 310 may include its house 110 and/or house 202. The energy storage 314 and the energy generator 316 may store and generate some of the energy that can be supplied in the apartment 310.

The control device 312 may receive at least one of energy demand information transmitted by the energy consuming devices 118 in the house 110, energy demand information transmitted by the control device 112 in the house 110, and information included in an energy supply request that the control device 112 transmits to the energy supplier 130. When the house 110 or the house 202 serves as the energy consuming devices 118 or the energy storage 114, the control device 312 may control energy supply to the house 110, like the control device 112 illustrated in FIG. 2. The control device 312 may serve as a relay between the house 110 (or 202) and the energy supplier 130, or between the control device 112 and the energy supplier 130.

Figure 4:
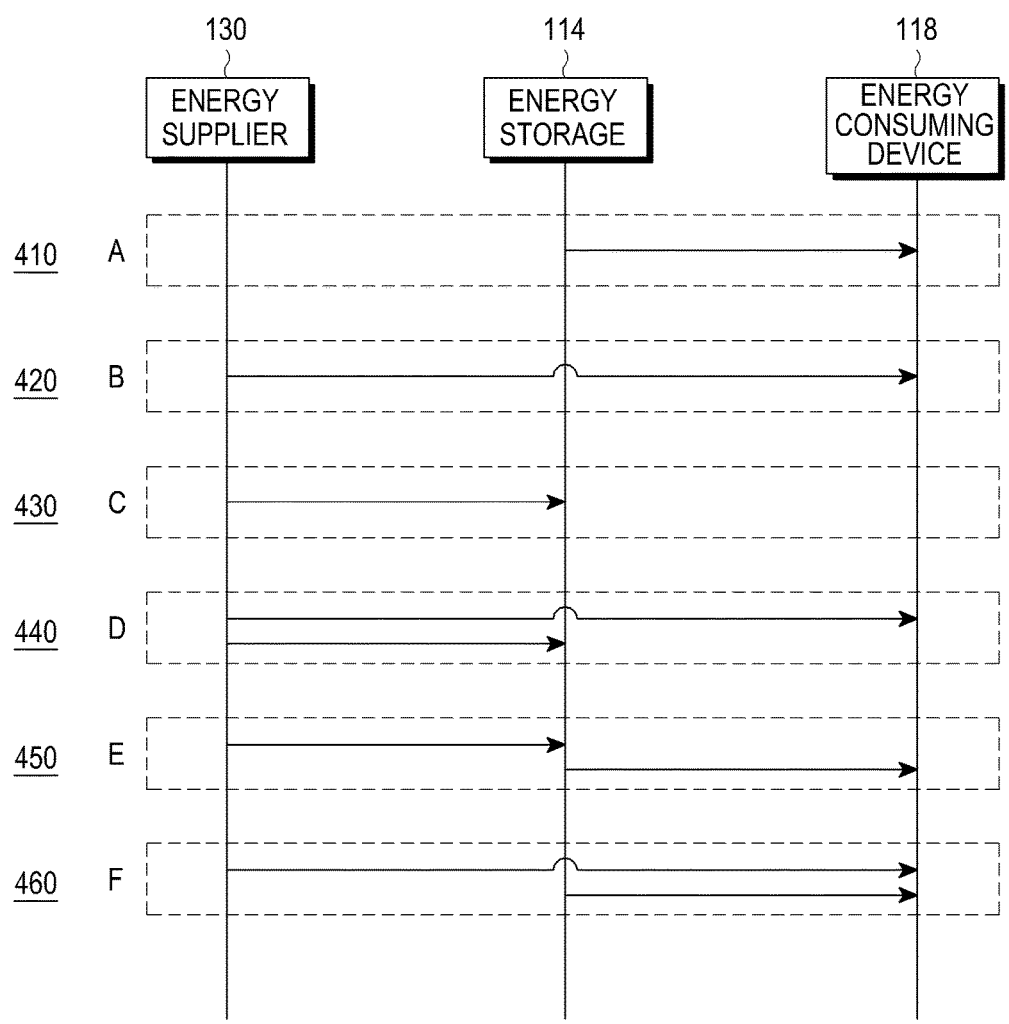
FIG. 4 is a diagram illustrating energy supply schemes according to an exemplary embodiment of the present invention.

FIG. 4 illustrates energy supply schemes according to an exemplary embodiment of the present invention.

Referring to FIG. 4, an energy supply scheme may be implemented in various different ways depending on the energy flow and the energy supplying/consuming entities. The energy supplying/consuming entities may include the energy supplier 130, the energy storage 114, and the energy consuming device 118. The energy supply scheme may include at least one of various schemes, for example, a scheme A 410, a scheme B 420, a scheme C 430, a scheme D 440, a scheme E 450, and a scheme 460 F. The energy supply schemes may not represent their time sequence or priority between the various schemes. When there are multiple arrows representing energy flows and included in a specific energy supply scheme, the arrows may have nothing to do with their time sequence. When an energy supply scheme includes at least two time periods, at least one of the schemes A 410 to F 460 may be selected and applied to each time period. A new energy supply scheme may be determined as a combination of all or some of the schemes A 410 to F 460.

The energy supply scheme A 410 may be a scheme in which energy is supplied from the energy storage 114 to the energy consuming device 118.

Figure 5:
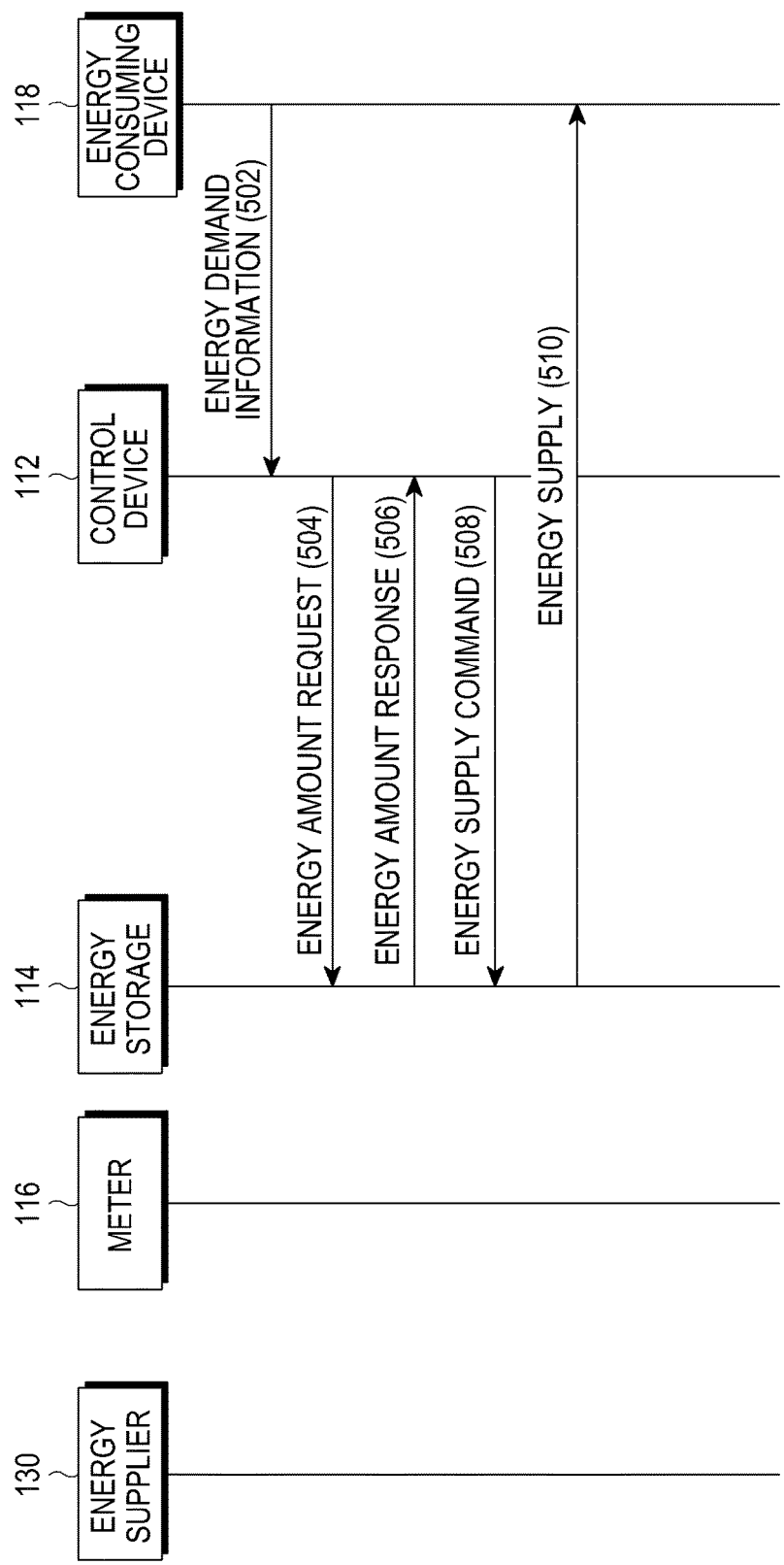
FIG. 5 is a diagram illustrating an energy supply procedure including an energy supply scheme A according to an exemplary embodiment of the present invention.

FIG. 5 illustrates an energy supply procedure including an energy supply scheme A according to an exemplary embodiment of the present invention.

Referring to FIG. 5, the energy consuming device 118 may transmit energy demand information in step 502 to the control device 112. If the energy consuming device 118 is the house 110 in FIG. 3, the energy demand information in step 502 may include information about a sum of energy demands of energy consuming devices in the house 110. The control device 112 may receive, from the meter 116, the total amount of energy consumption or the amount of energy consumption per hour for the energy consuming device 118.

The control device 112 may transmit an energy amount request in step 504 to the energy storage 114. The energy storage 114 may transmit an energy amount response in step 506 including information about the amount of stored energy to the control device 112 in response to the energy amount request in step 504. The control device 112 may periodically transmit the energy amount request in step 504. If the energy amount request in step 504 that the control device 112 transmits is omitted, the energy storage 114 may periodically transmit the energy amount response in step 506 to the control device 112. The energy storage 114 may transmit the energy amount response in step 506 to the control device 112 depending on an event that occurs when the amount of stored energy reaches a preset level. The control device 112 may continuously monitor the amount of energy stored in the energy storage 114, omitting the exchange of the energy amount request in step 504 and the energy amount response in step 506. When the control device 112 knows in advance the amount of energy stored in the energy storage 114, the exchange of the energy amount request in step 504 and the energy amount response in step 506 between the control device 112 and the energy storage 114 may be omitted.

If it is determined that the amount of stored energy is sufficient to be supplied to the energy consuming device 118, the control device 112 may transmit an energy supply command in step 508 to the energy storage 114 so that energy stored in the energy storage 114 may be supplied to the energy consuming device 118. Upon receiving the energy supply command in step 508, the energy storage 114 may supply its energy in step 510 to the energy consuming device 118. When the energy supply scheme A 410 is applied, the energy supplier 130 and the meter 116 may not participate in the energy supply operation.

The energy supply scheme B 420 may be a scheme in which energy is supplied from the energy supplier 130 to the energy consuming device 118.

Figure 6:
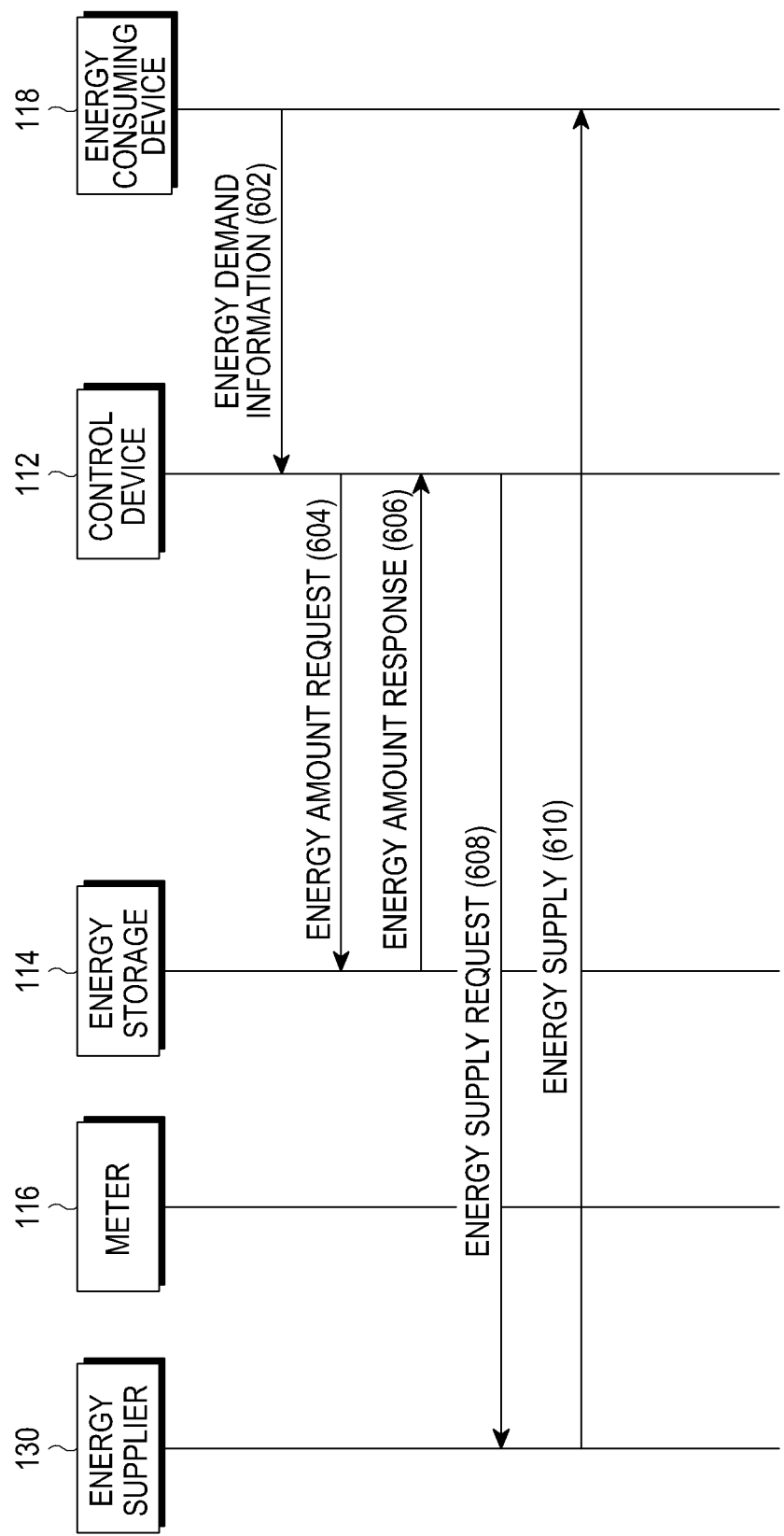
FIG. 6 is a diagram illustrating an energy supply procedure including an energy supply scheme B according to an exemplary embodiment of the present invention.

FIG. 6 illustrates an energy supply procedure including an energy supply scheme B 420 according to an exemplary embodiment of the present invention.

Referring to FIG. 6, a description of energy demand information in step 602, an energy amount request in step 604, and an energy amount response in step 606 will be replaced by the description of the energy demand information in step 502, the energy amount request in step 504, and the energy amount response in step 506 in FIG. 5. By verifying the energy amount response in step 606, the control device 112 determines if the amount of energy stored in the energy storage 114 is sufficient to be supplied to the energy consuming device 118. If the amount of energy stored in the energy storage 114 is not sufficient to be supplied to the energy consuming device 118, or if the time-specific energy costs are taken into account, the control device 112 may transmit an energy supply request in step 608 to the energy supplier 130.

The energy supply request in step 608 may include information about the amount of requested energy. The energy supplier 130 may receive the energy supply request in step 608. The energy supplier 130 may supply its energy in step 610 to the energy consuming device 118. At this point, the meter 116 may detect the amount of energy being supplied from the energy supplier 130 to the energy consuming device 118. The meter 116 may also detect the amount of energy consumed in the energy consuming device 118. The control device 112 may control the amount of energy being supplied, to be equal to the amount of requested energy. For example, the meter 116 may detect the amount of energy supplied from the energy supplier 130 to the energy consuming device 118, and the control device 112 may block the energy supply to the energy consuming device 118 if the amount of energy detected by the meter 116 reaches the amount of requested energy. In addition, the control device 112 may transmit information about the amount of requested energy to the meter 116, and the meter 116 may block the energy supply to the energy consuming device 118 if the amount of energy being supplied reaches the amount of requested energy. Furthermore, the control device 112 may detect the amount of energy being supplied in real time, and block the energy supply to the energy consuming device 118 if the amount of energy being supplied meets the amount of requested energy.

Energy supply scheme C 430 may be a scheme in which energy is supplied from the energy supplier 130 to the energy storage 114.

Figure 7:
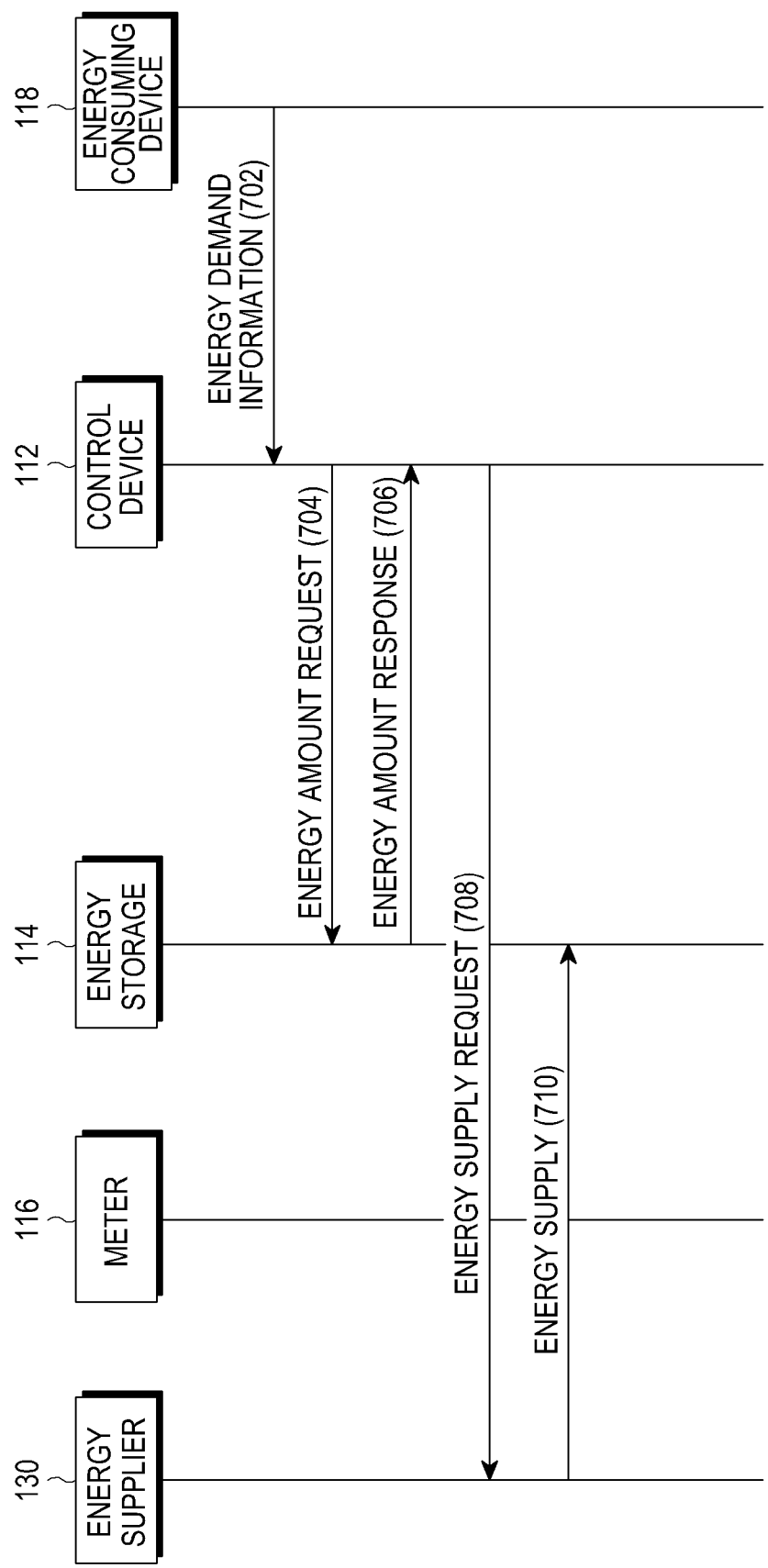
FIG. 7 is a diagram illustrating an energy supply procedure including an energy supply scheme C according to an exemplary embodiment of the present invention.

FIG. 7 illustrates an energy supply procedure including an energy supply scheme C according to an exemplary embodiment of the present invention.

Referring to FIG. 7, a description of energy demand information in step 702, an energy amount request in step 704, and an energy amount response in step 706 will be replaced by the description of the energy demand information in step 502, the energy amount request in step 504, and the energy amount response in step 506 in FIG. 5. By verifying the energy amount response in step 706, the control device 112 determines if the amount of energy stored in the energy storage 114 is sufficient to be supplied to the energy consuming device 118. If the amount of energy stored in the energy storage 114 is not sufficient to be supplied to the energy consuming device 118, or if the time-specific energy costs are taken into account, the control device 112 may transmit an energy supply request in step 708 to the energy supplier 130.

For example, if the amount of energy to be used in the energy consuming device 118 is greater than the amount of energy stored in the energy storage 114 during an operation time period where the energy consuming device 118 operates, the control device 112 may search for a time period whose energy cost is lower than the energy cost corresponding to the operation time period, in a time period from an arbitrary time (e.g., the current time) to an end time of the operation time period. The control device 112 may control the energy to be supplied to the energy storage 114 by applying the energy supply scheme C 430 to some of the searched time period. In other words, the energy supply scheme C 430 may be applied to some of the time period where the operation time period does not overlap the searched time period. The control device 112 may control the energy stored in the energy storage 114 to be supplied to the energy consuming device 118 by applying the energy supply scheme A 410 in the operation time period.

The energy supplier 130 may receive the energy supply request in step 708. The energy supplier 130 may supply its energy in step 710 to the energy storage 114 in reply to the energy supply request in step 708.

The energy supply scheme D 440 may be a scheme in which energy is supplied from the energy supplier 130 to both the energy storage 114 and the energy consuming device 118.

Figure 8:
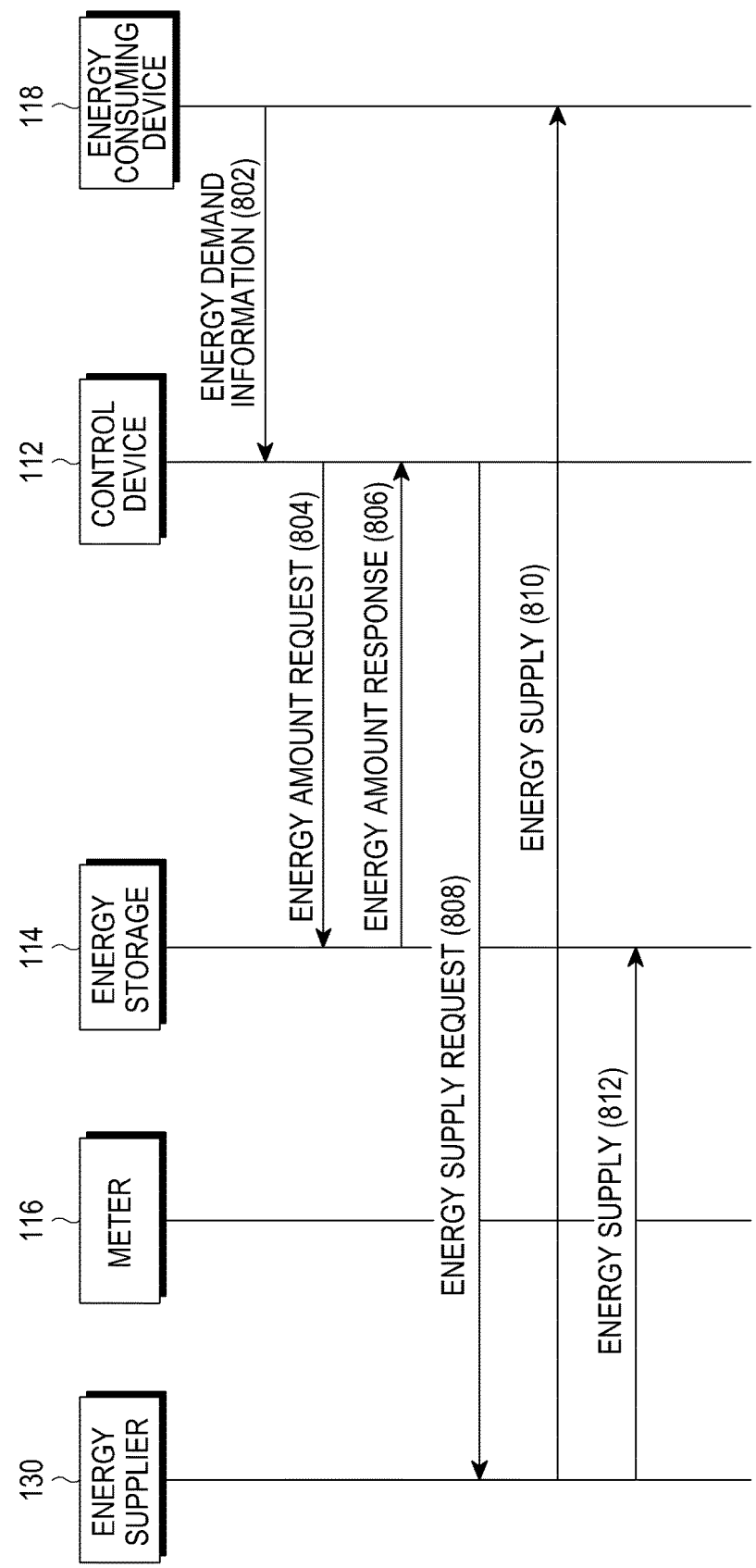
FIG. 8 is a diagram illustrating an energy supply procedure including an energy supply scheme D according to an exemplary embodiment of the present invention.

FIG. 8 illustrates an energy supply procedure including an energy supply scheme D according to an exemplary embodiment of the present invention.

Referring to FIG. 8, a description of energy demand information in step 802, an energy amount request in step 804, and an energy amount response in step 806 will be replaced by the description of the energy demand information in step 502, the energy amount request in step 504, and the energy amount response in step 506 in FIG. 5. By verifying the energy amount response in step 806, the control device 112 determines if the amount of energy stored in the energy storage 114 is sufficient to be supplied to the energy consuming device 118. If the amount of energy stored in the energy storage 114 is not sufficient to be supplied to the energy consuming device 118, or if the time-specific energy costs are taken into account, the control device 112 may transmit an energy supply request in step 808 to the energy supplier 130.

For example, if the amount of energy to be used in the energy consuming device 118 is greater than the amount of energy stored in the energy storage 114 during an operation time period where the energy consuming device 118 operates, the control device 112 may search for a time period whose energy cost is lower than the energy cost corresponding to the operation time period, in a time period from an arbitrary time (e.g., the current time) to an end time of the operation time period. The control device 112 may control the energy to be supplied to the energy storage 114 and/or the energy consuming device 118 by applying the energy supply scheme D 440 in some of the searched time period. In other words, the energy supply scheme D 440 may be applied to some of the time period where the operation time period overlaps the searched time period. The control device 112 may control the energy stored in the energy storage 114 to be supplied to the energy consuming device 118 by applying the energy supply scheme A 410 in the operation time period.

The energy supplier 130 may receive the energy supply request in step 808. The energy supplier 130 may supply its energy in step 812 and in step 810 to the energy storage 114 and the energy consuming device 118 in reply to the energy supply request in step 808, respectively.

The energy supply scheme E 450 may be a scheme in which energy is supplied from the energy supplier 130 to the energy storage 114 and energy is supplied from the energy storage 114 to the energy consuming device 118.

Figure 9:
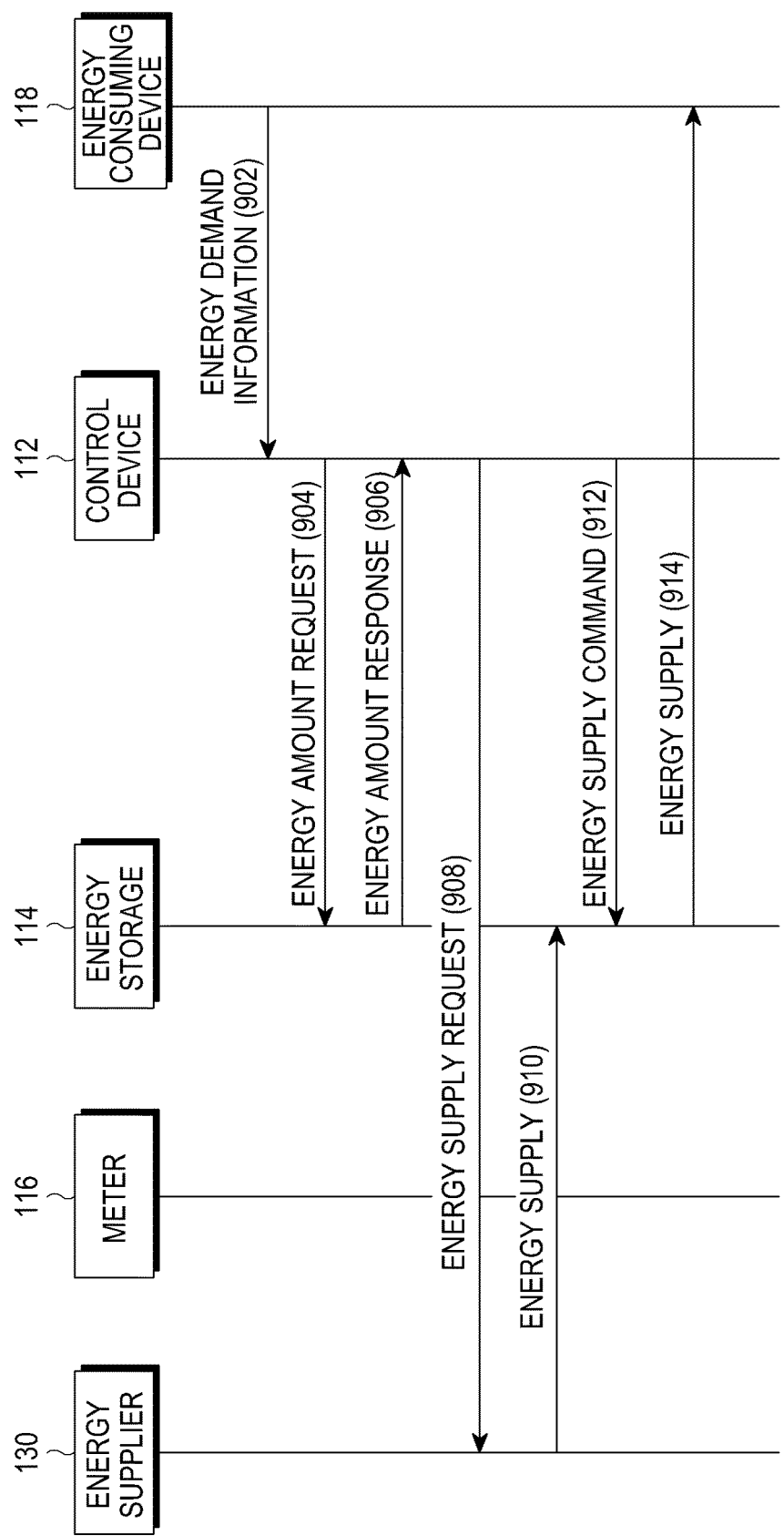
FIG. 9 is a diagram illustrating an energy supply procedure including an energy supply scheme E according to an exemplary embodiment of the present invention.

FIG. 9 illustrates an energy supply procedure including an energy supply scheme E according to an exemplary embodiment of the present invention.

Referring to FIG. 9, a description of energy demand information in step 902, an energy amount request in step 904, and an energy amount response in step 906 will be replaced by the description of the energy demand information in step 502, the energy amount request in step 504, and the energy amount response in step 506 in FIG. 5. By verifying the energy amount response in step 906, the control device 112 determines if the amount of energy stored in the energy storage 114 is sufficient to be supplied to the energy consuming device 118. If the amount of energy stored in the energy storage 114 is not sufficient to be supplied to the energy consuming device 118, or if the time-specific energy costs are taken into account, the control device 112 may transmit an energy supply request in step 908 to the energy supplier 130.

For example, if the amount of energy to be used in the energy consuming device 118 is greater than the amount of energy stored in the energy storage 114 during an operation time period where the energy consuming device 118 operates, the control device 112 may search for a time period whose energy cost is lower than the energy cost corresponding to the operation time period, in a time period from an arbitrary time (e.g., the current time) to an end time of the operation time period. The control device 112 may control the energy to be supplied to the energy storage 114 and the energy consuming device 118 substantially at the same time by applying the energy supply scheme E 450 in some of the searched time period. In other words, the energy supply scheme E 450 may be applied to some of the time period where the operation time period overlaps the searched time period. The control device 112 may control the energy stored in the energy storage 114 to be supplied to the energy consuming device 118 by applying the energy supply scheme A 410 in the operation time period.

In an exemplary implementation, the energy storage 114 may be always set to supply energy to the energy consuming device 118, without directly forwarding the energy from the energy supplier 130 to the energy consuming device 118. In this case, the control device 112 may not consider the energy supply schemes B 420, D 440, and F 460.

The energy supplier 130 may receive an energy supply request in step 908. The energy supplier 130 may supply its energy in step 910 to the energy storage 114 in reply to the energy supply request in step 908. The control device 112 may control the energy in step 914 stored in the energy storage 114 to be supplied to the energy consuming device 118 by transmitting an energy supply command in step 912 to the energy storage 114. The energy supply request in step 908 and the energy supply command in step 912 that the control device 112 transmits, may be different from the illustrated order, or may be transmitted simultaneously. Similarly, the energy supply in steps 910 and 914 may be different from the illustrated order, or may be performed simultaneously.

The energy supply scheme F 460 may be a scheme in which energy is supplied from the energy supplier 130 to the energy consuming device 118 and energy is supplied from the energy storage 114 to the energy consuming device 118.

Figure 10:
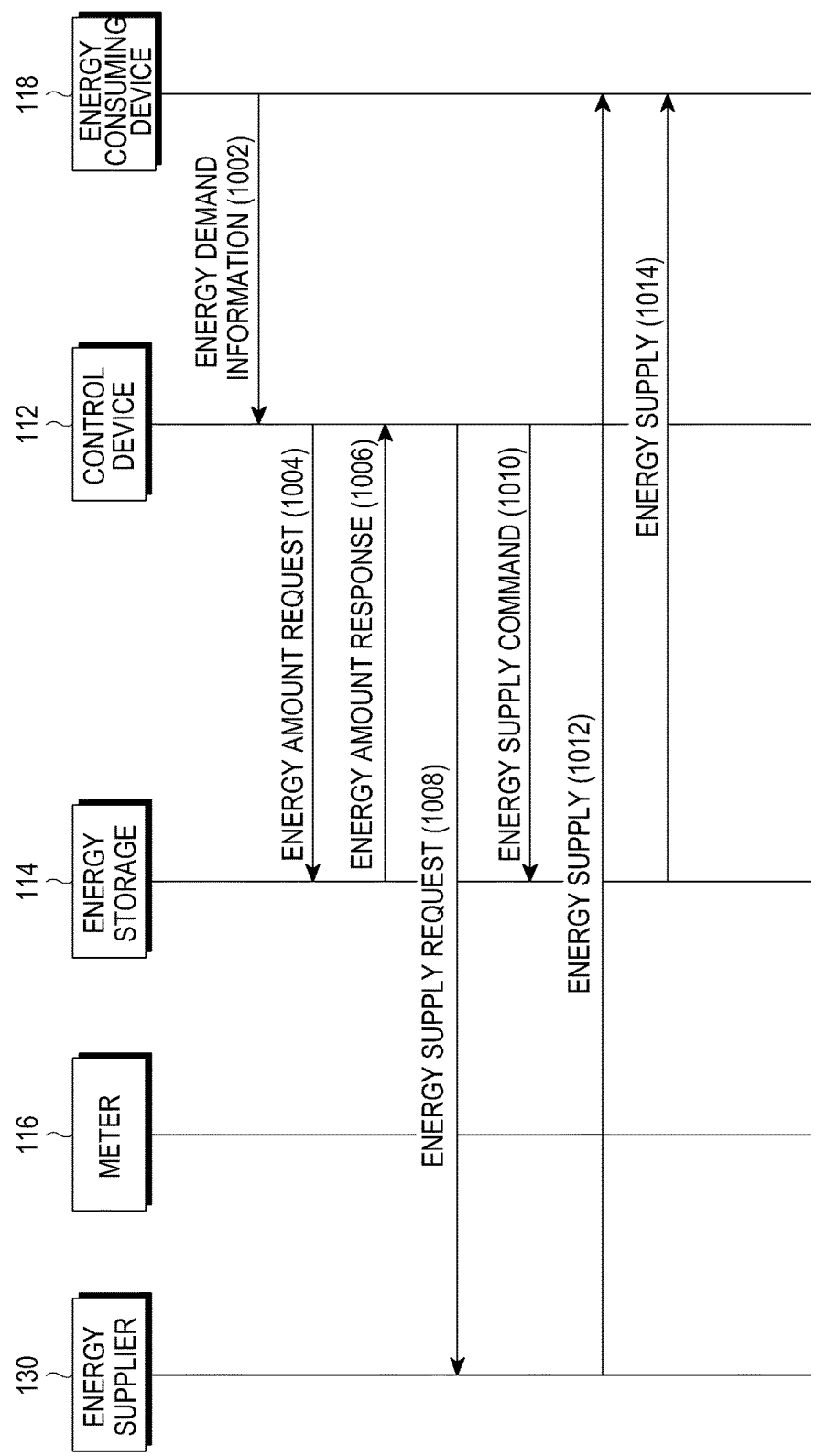
FIG. 10 is a diagram illustrating an energy supply procedure including an energy supply scheme F according to an exemplary embodiment of the present invention.

FIG. 10 illustrates an energy supply procedure including an energy supply scheme F according to an exemplary embodiment of the present invention.

Referring to FIG. 10, a description of energy demand information in step 1002, an energy amount request in step 1004, and an energy amount response in step 1006 will be replaced by the description of the energy demand information in step 502, the energy amount request in step 504, and the energy amount response in step 506 in FIG. 5. By verifying the energy amount response in step 1006, the control device 112 determines if the amount of energy stored in the energy storage 114 is sufficient to be supplied to the energy consuming device 118. If the amount of energy stored in the energy storage 114 is not sufficient to be supplied to the energy consuming device 118, or if the time-specific energy costs are taken into account, the control device 112 may transmit an energy supply request in step 1008 including information about the amount of requested energy to the energy supplier 130. For example, it can be assumed that an operation of the energy consuming device 118 is required in a specific time period and the amount of energy stored in the energy storage 114 is less than the amount of energy to be used in the energy consuming device 118 in the specific time period. In this case, the control device 112 may control the energy to be supplied from each of the energy storage 114 and the energy supplier 130 to the energy consuming device 118 by applying the energy supply scheme F 460 in the specific time period.

The control device 112 may control the energy in step 1014 stored in the energy storage 114 to be supplied to the energy consuming device 118 by transmitting an energy supply command in step 1010 to the energy storage 114. In addition, the control device 112 may control the energy supplier 130 to supply energy in step 1012 to the energy consuming device 118 by transmitting an energy supply command in step 1008 to the energy supplier 130. The energy supply request in step 1008 and the energy supply command in step 1010 that the control device 112 transmits, may be different from the illustrated order, or may be transmitted simultaneously. Similarly, the energy supply in steps 1012 and 1014 may be different from the illustrated order, or may be performed simultaneously.

A relationship between the amount of required energy and the amount of stored energy and the concept of the amount of requested energy will now be described in more detail below with reference to FIGS. 11 to 13.

Figure 11:
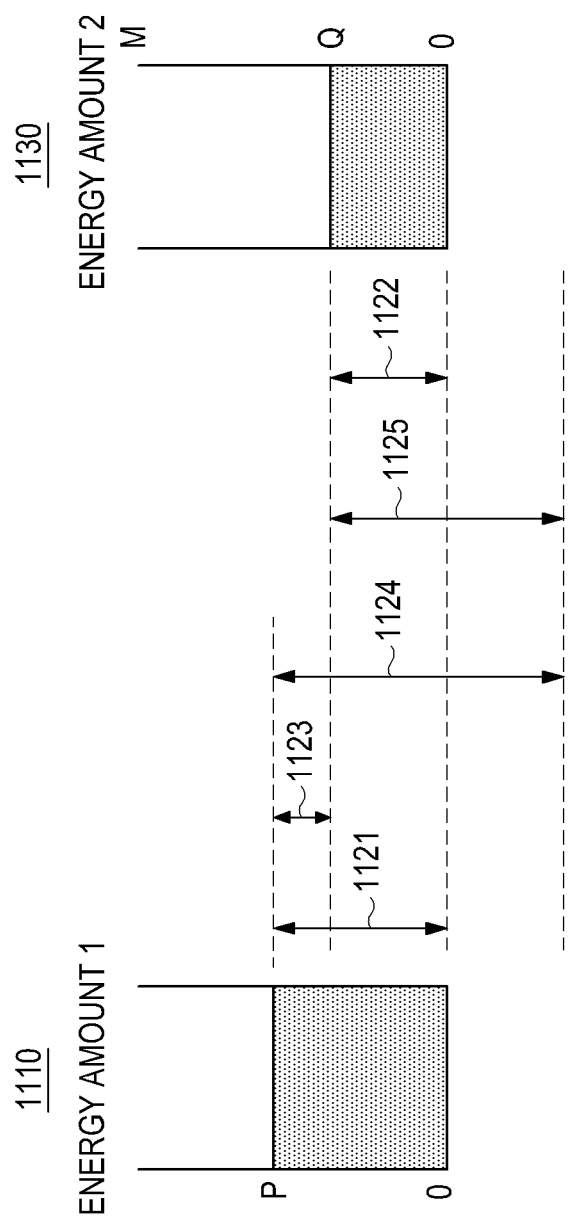
FIG. 11 is a diagram illustrating a concept of an amount of requested energy according to an exemplary embodiment of the present invention.

FIG. 11 illustrates a concept of the amount of requested energy according to an exemplary embodiment of the present invention.

Referring to FIG. 11, a first amount 1110 of energy may be the amount P 1121 of energy that is stored in the energy storage 114 at a first time. The first time may be the time the control device 112 determined the energy demands of at least one energy consuming device 118, i.e., the time the control device 112 received information about the energy demands, or may be the current time. A second amount 1130 of energy may be the amount Q 1122 of energy that is required to be stored in the energy storage 114 at a second time required for the completion of operations of the energy consuming devices 118. The second energy amount 1130 may also be the amount Q 1122 of energy that is required to be stored in the energy storage 114 at an arbitrary time after the first time. For example, the second energy amount 1130 may be the amount Q 1122 of energy that is required to be stored in the energy storage 114 at the second time required for the completion of operations of the energy consuming devices 118, or at an arbitrary time before the second time. The second energy amount 1130 may also be greater than or equal to the amount Q 1122.

The amount Q 1122 may be a preset amount of energy. The preset amount of energy may include the target amount of energy. The preset amount of energy may also include reserve energy. For example, the amount Q 1122 may be set to reserve energy just in case of power failure in hospitals, security facilities, or facilities operating nonstop, or may be set to economically operate an energy supply. The control device 112 may also control the amount of energy stored in the energy storage 114 to be at least the amount Q 1122 until a preset time. The preset amount of energy is a minimum amount of energy that is required to be stored at the second time, and for this, the control device 112 may receive at least one of information about the second time and the amount Q 1122, from a user. The preset amount of energy may be set arbitrarily by the control device 112. The amount Q 1122 may be a value between 0 and a preset maximum amount M of stored energy.

If the amount P 1121 is greater than the amount Q 1122, a value determined by subtracting the amount Q 1122 from the amount P 1121 may represent the amount 1123 of energy actually available in the amount of energy stored in the energy storage 114. The amount 1124 of energy to be used may be acquired by determining the energy demands of at least one energy consuming device 118. The amount of required energy is a sum of the preset amount Q 1122 of energy and the amount 1124 of energy to be used. The control device 112 may determine if the amount energy stored in the energy storage 114 is sufficient to be supplied to the energy consuming devices 118, by comparing the amount of required energy with the amount P 1121 of stored energy. If a value determined by subtracting the amount P 1121 of stored energy from the amount of required energy is greater than 0, the control device 112 may determine that the amount of energy stored in the energy storage 114 is not sufficient to be supplied to the energy consuming devices 118. At this point, the amount of requested energy may be greater than or equal to a difference 1125 between the amount of required energy and the amount of stored energy. The amount of requested energy may be the amount of energy that will be supplied from the energy supplier 130 during a time period from the first time to the second time. In an exemplary implementation, as for the amount of requested energy, a value, which is different from the above amount of requested energy, may be acquired based on a different preset time period.

Figure 12:
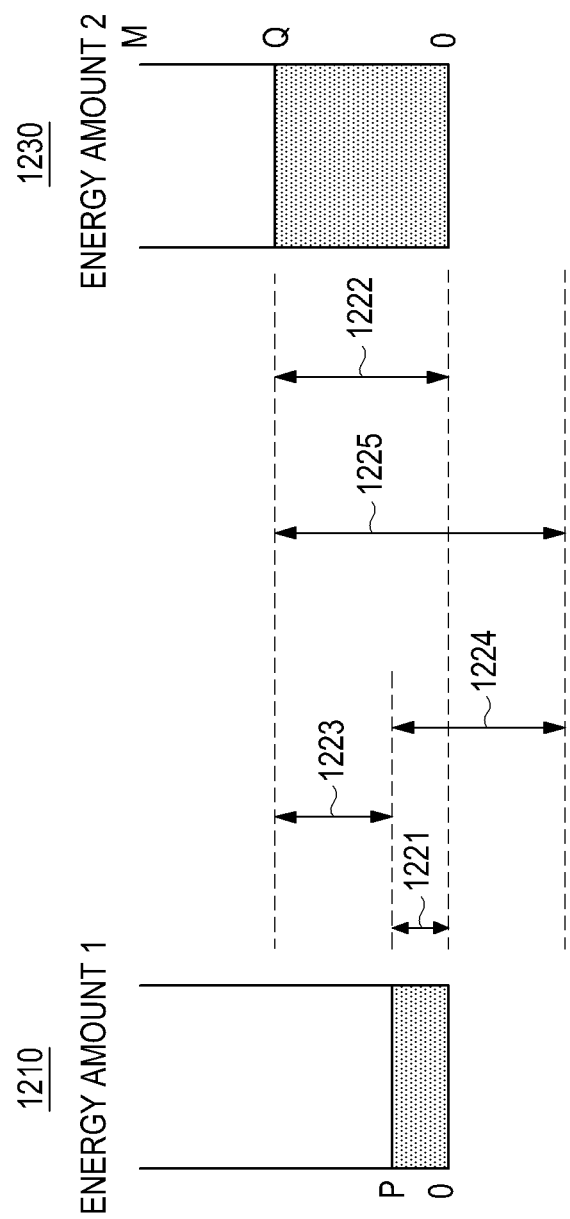
FIG. 12 is a diagram illustrating a concept of an amount of requested energy according to an exemplary embodiment of the present invention.

FIG. 12 illustrates a concept of an amount of requested energy according to an exemplary embodiment of the present invention.

Referring to FIG. 12, a first amount 1210 of energy may be the amount P 1221 of energy that is stored in the energy storage 114 at a first time. The first time may be the time the control device 112 determined the energy demands of at least one energy consuming device 118, i.e., the time the control device 112 received information about the energy demands, or may be the current time. A second amount 1230 of energy may be the amount Q 1222 of energy that is required to be stored in the energy storage 114 at a second time or an arbitrary time. The second amount 1230 of energy, or the amount Q 1222 may be a preset amount of energy.

If the amount Q 1222 is greater than the amount P 1221, a difference between the amount P 1221 and the amount Q 1222 may be the amount 1223 of energy that will be supplied to the energy storage 114 so that the amount of energy stored in the energy storage 114 at the second time or an arbitrary time may correspond to the preset amount of energy. The amount 1224 of energy to be used may be acquired by determining energy demands. The amount of required energy is a sum of the preset amount Q 1222 of energy and the amount 1224 of energy to be used. The control device 112 may determine if the amount of energy stored in the energy storage 114 is sufficient to be supplied to the energy consuming devices 118, by comparing the amount of required energy with the amount P 1221 of stored energy. If a value determined by subtracting the amount P 1221 of stored energy from the amount of required energy is greater than 0, the control device 112 may determine that the amount of energy stored in the energy storage 114 is not sufficient to be supplied to the energy consuming devices 118. At this point, the amount of requested energy may be greater than or equal to a difference 1225 between the amount of required energy and the amount of stored energy.

Figure 13:
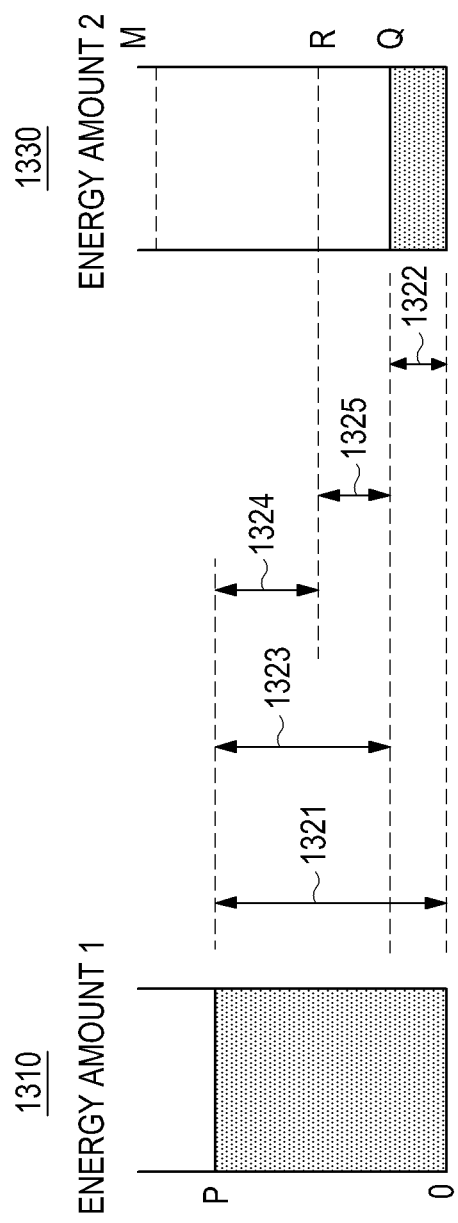
FIG. 13 is a diagram illustrating a concept of an amount of requested energy according to an exemplary embodiment of the present invention.

FIG. 13 illustrates a concept of an amount of requested energy according to an exemplary embodiment of the present invention.

Referring to FIG. 13, a first amount 1310 of energy may be the amount P 1321 of energy that is stored in the energy storage 114 at a first time. The first time may be the time the control device 112 determined the energy demands of at least one energy consuming device 118, i.e., the time the control device 112 received information about the energy demands, or may be the current time. A second amount 1330 of energy may be the amount Q 1322 of energy that is required to be stored in the energy storage 114 at a second time or an arbitrary time. The second amount 1330 of energy, or the amount Q 1322 may be a preset amount of energy.

If the amount P 1321 is greater than the amount Q 1322, a value determined by subtracting the amount Q 1322 from the amount P 1321 may represent the amount 1323 of energy actually available in the amount of energy stored in the energy storage 114. The amount 1324 of energy to be used may be acquired by determining the energy demands. The amount of required energy is a sum of the preset amount Q 1322 of energy and the amount 1324 of energy to be used. The control device 112 may determine if the amount energy stored in the energy storage 114 is sufficient to be supplied to the energy consuming devices 118, by comparing the amount of required energy with the amount P 1321 of stored energy. If a value determined by subtracting the amount P 1321 of stored energy from the amount of required energy is less than or equal to 0, the control device 112 may determine that the amount P 1321 of energy stored in the energy storage 114 is sufficient to be supplied to the energy consuming devices 118. At this point, the amount of requested energy may be less than or equal to a difference R 1325 between the amount of required energy and the amount P 1321 of stored energy. An energy supply request including information about the amount of requested energy may further include information about the sale of the stored energy. If a value determined by subtracting the amount P 1321 of stored energy from the amount of required energy is less than or equal to 0, the control device 112 may omit transmitting the energy supply request by applying the energy supply scheme A 410. In this case, the second amount 1330 of energy may be R.

Figure 14:
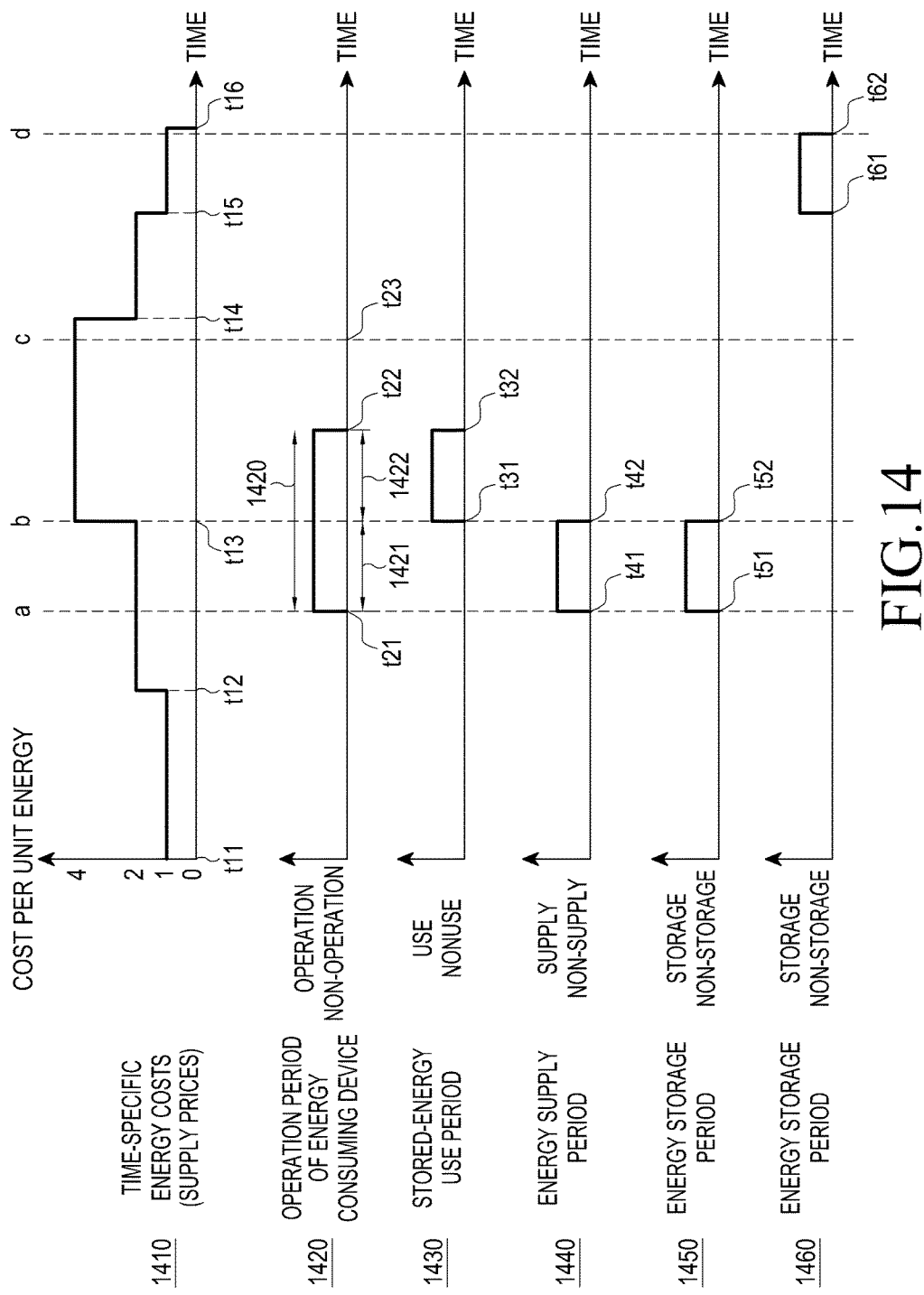
FIG. 14 is a diagram illustrating time-specific energy costs and time periods associated with energy supply schemes according to an exemplary embodiment of the present invention.

FIG. 14 illustrates time-specific energy costs and time periods associated with energy supply schemes according to an exemplary embodiment of the present invention.

The control device 112 may determine energy demands. The control device 112 may acquire the amount of energy to be used, based on the determined energy demands. The control device 112 may acquire a first operation time period 1420 where the energy consuming device(s) 118 operates, based on information about the energy demands and time-specific energy costs 1410. The control device 112 may determine the amount of energy stored in the energy storage 114. The control device 112 may compare the amount of required energy with the amount of stored energy, and may also acquire the amount of requested energy. The control device 112 may determine an energy supply scheme. At this point, the control device 112 may determine at least one of a stored-energy use time period 1430 where the stored energy is used, an energy supply time period 1440 where energy is supplied from the energy supplier 130, and energy storage time periods 1450 and 1460 where energy is stored in the energy storage 114.

A dashed line a may correspond to a first time representing the time the control device 112 determined the energy demands, i.e., the time the control device 112 received information about the energy demands, or representing the current time. A dashed line c may correspond to a maximum delay time or an arbitrary time required for the completion of an operation of the energy consuming device 118. For example, if the energy consuming device 118 is a washing machine, it can be assumed that the maximum delay time required for the completion of an operation of the washing machine is t23, and the first operation time period 1420 is required as a time for which the washing machine operates consuming electrical energy. The control device 112 may acquire the first operation time period 1420 based on the time-specific energy costs 1410. In other words, by determining the time-specific energy costs 1410 of time periods in between the dashed line a (or time t21) and the dashed line c (or time t23), the control device 112 may acquire, as the first operation time period 1420, a period from t21 to t22, which corresponds to the lowest energy cost during the first operation time period 1420.

The first operation time period 1420 may be preset, or may be acquired within a limited range depending on the energy demand information. For example, if the energy consuming device is an air conditioner or a refrigerator, the first operation time period 1420 may be preset depending on the energy demand information or may be restrictively determined within a preset range, for temperature control.

If the amount of energy to be used in an energy consuming device 118 is greater than the amount of energy stored in the energy storage 114 in the first operation time period 1420, or if it is determined that the amount of stored energy is not sufficient to be supplied to the energy consuming device 118, the control device 112 may search for a time period (i.e., a time period 1421 from the dashed line a to a dashed line b) whose energy cost (i.e., cost of 2 per unit energy) is lower than or equal to the energy costs (i.e., costs of 2 and 4 per unit energy) corresponding to the first operation time period 1420, in a time period from the dashed line a to the end time t22 of the first operation time period 1420. A second operation time period 1421 may be the searched time period, and the second operation time period 1421 may include a time period overlapping the first operation time period 1420. A third operation time period 1422 may be the remaining operation time period determined by excepting the second operation time period 1421 from the first operation time period 1420. If the second operation time period 1421 precedes the third operation time period 1422, and the amount of energy to be consumed in the energy consuming device 118 during the third operation time period 1422 is greater than the amount of stored energy, the control device 112 may control the energy to be supplied from the energy supplier 130 to the energy storage 114, by transmitting an energy supply request to the energy supplier 130 in a partial time period included in the searched time period. The control device 112 may apply at least one of the energy supply schemes C 430, D 440, and E 450 so that energy may be supplied to the energy storage 114. For example, if the amount of energy stored in the energy storage 114 is not sufficient to be supplied to the energy consuming device 118 during the third operation time period 1422, the control device 112 may acquire a time period from t51 to t52 as an energy storage time period 1450 so that energy may be supplied to the energy storage 114 in a partial time period included in the second operation time period 1421. The amount of energy to be stored in the energy storage 114 may be acquired in the partial time period included in the second operation time period 1421. The control device 112 may apply at least one of the energy supply schemes D 440 and E 450 in the partial time period included in the second operation time period 1421 so that energy may be supplied to the energy storage 114.

The first operation time period 1420 may include the second and third operation time periods 1421 and 1422, which are different in terms of the time-specific energy costs 1410. If the third operation time period 1422 is higher than the second operation time period 1421 in energy cost, the control device 112 may control the energy consuming device 118 to first consume the energy stored in the energy storage 114 in the third operation time period 1422 than the second operation time period 1421. In other words, the energy consuming device 118 may first consume the energy stored in the energy storage 114 than the energy supplied from the energy supplier 130 in the third operation time period 1422.

For example, the control device 112 may acquire, as the stored-energy use time period 1430, a time period from t31 to t32, which is included in the third operation time period 1422 rather than the second operation time period 1421. The amount of energy used in the stored-energy use time period 1430 may include at least one of the amount of energy stored at the time indicated by the dashed line a and the amount of energy to be stored in the energy storage 114 in a partial time period included in the second operation time period 1421.

The energy supply time period 1440 where energy is supplied from the energy supplier 130 to the energy storage 114 or the energy consuming device 118, may be acquired in the time period from the dashed line a to the dashed line b. The control device 112 may control the energy to be supplied to the energy storage 114 or the energy consuming device 118 by selecting at least one of the energy supply schemes B 420 to F 460. In other words, the control device 112 may control the energy to be supplied from the energy supplier 130 to the energy storage 114 or the energy consuming device 118, by transmitting an energy supply request to the energy supplier 130 in the energy supply time period 1440. The amount of energy supplied from the energy supplier 130 in the energy supply time period 1440 may be controlled depending on the amount of requested energy, which is included in the energy supply request.

The control device 112 may control energy supply by applying the energy supply scheme A 410 in a partial time period included in the third operation time period 1422. The control device 112 may control the energy stored in the energy storage 114 to be first consumed in the third operation time period 1422, and control the energy left in the third operation time period 1422 to be consumed in a partial time period included in the second operation time period 1421.

The control device 112 may control the amount of energy supplied from the energy supplier 130 in the energy supply time period 1440 and/or the amount of energy to be stored in the energy storage time period 1450, by taking into account the target amount of energy required to be stored in the energy storage 114 at a preset time and/or a preset amount of energy. For example, it can be assumed that the amount of energy stored in the energy storage 114 is equal to the amount of energy that will be consumed in the energy consuming device 118 in the third operation time period 1422. If the preset time corresponds to the dashed line c, the amount of energy to be stored in the energy storage time period 1450 may be the target amount of energy or the preset amount of energy. If a preset time corresponds to a dashed line d, the energy storage time period 1460 may be acquired as a time period from t61 to t62, which is included in a time period from t15 to the dashed line d. If there is no preset time, the control device 112 may control the energy to be first stored in the time periods (e.g., the time period of t11~T12 and the time period of t15~t16) corresponding to the lowest time-specific energy cost.

Figure 15:
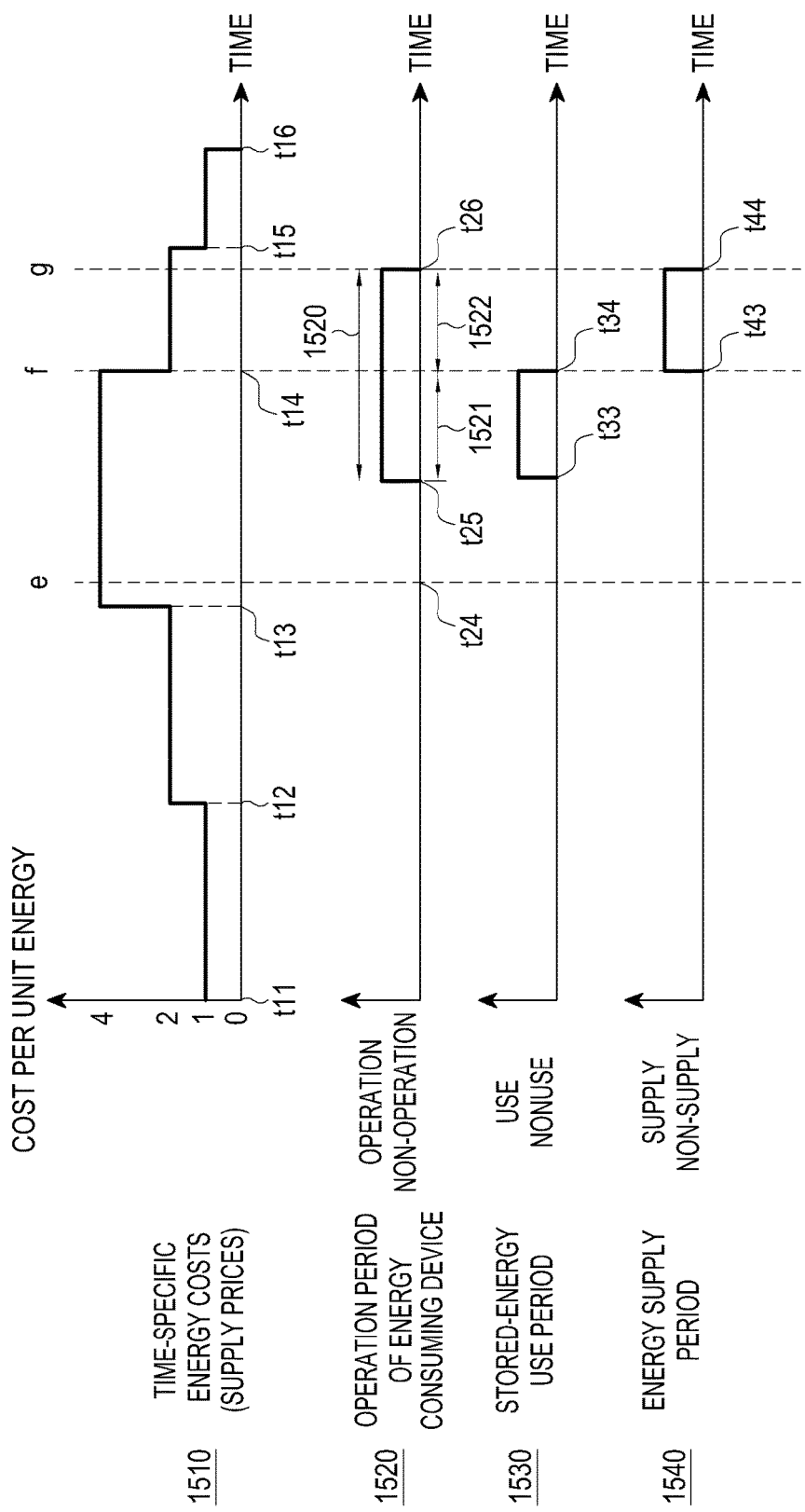
FIG. 15 is a diagram illustrating time-specific energy costs and time periods associated with energy supply schemes according to an exemplary embodiment of the present invention.

FIG. 15 illustrates time-specific energy costs and time periods associated with energy supply schemes according to an exemplary embodiment of the present invention.

A dashed line e may correspond to a first time representing the time the control device 112 determined the energy demands, i.e., the time the control device 112 received information about the energy demands, or representing the current time. A dashed line g may correspond to a maximum delay time or an arbitrary time required for the completion of an operation of the energy consuming device 118. The control device 112 may acquire a first operation time period 1520 based on the time-specific energy costs 1510.

If the amount of energy to be used in the energy consuming device 118 is greater than the amount of energy stored in the energy storage 114 in the first operation time period 1520, or if it is determined that the amount of stored energy is not sufficient to be supplied to the energy consuming device 118, the control device 112 may search for a time period (i.e., a time period 1522 from a dashed line f to the dashed line g) whose energy cost (i.e., cost of 2 per unit energy) is lower than or equal to the energy costs (i.e., costs of 4 and 2 per unit energy) corresponding to the first operation time period 1520, in a time period from the dashed line e to the end time t26 of the first operation time period 1520. The control device 112 may determine if the searched second operation time period 1522 precedes a remaining third operation time period 1521 determined by excepting the second operation time period 1522 from the first operation time period 1520. If the second operation time period 1522 does not precede the third operation time period 1521, the control device 112 may omit the operation of controlling the energy to be supplied from the energy supplier 130 to the energy storage 114.

The first operation time period 1520 may include the second and third operation time periods 1522 and 1521, which are different in terms of the energy cost. If the third operation time period 1521 is higher than the second operation time period 1522 in energy cost, the control device 112 may control the energy consuming device 118 to first consume the energy stored in the energy storage 114 in the third operation time period 1521 than the second operation time period 1522.

For example, the control device 112 may first acquire, as a stored-energy use time period 1530, a time period from t33 to t34, which is included in the third operation time period 1521 rather than the second operation time period 1522. The control device 112 may acquire a time period from t43 to t44, which is included in a time period from the dashed line f to the dashed line g, as an energy supply time period 1540 where energy is supplied from the energy supplier 130 to the energy storage 114 or the energy consuming device 118. The control device 112 may acquire the time period included in the time period from the dashed line f to the dashed line g as an energy storage time period, by taking into account the target amount of energy and/or the preset amount of energy.

Figure 16:
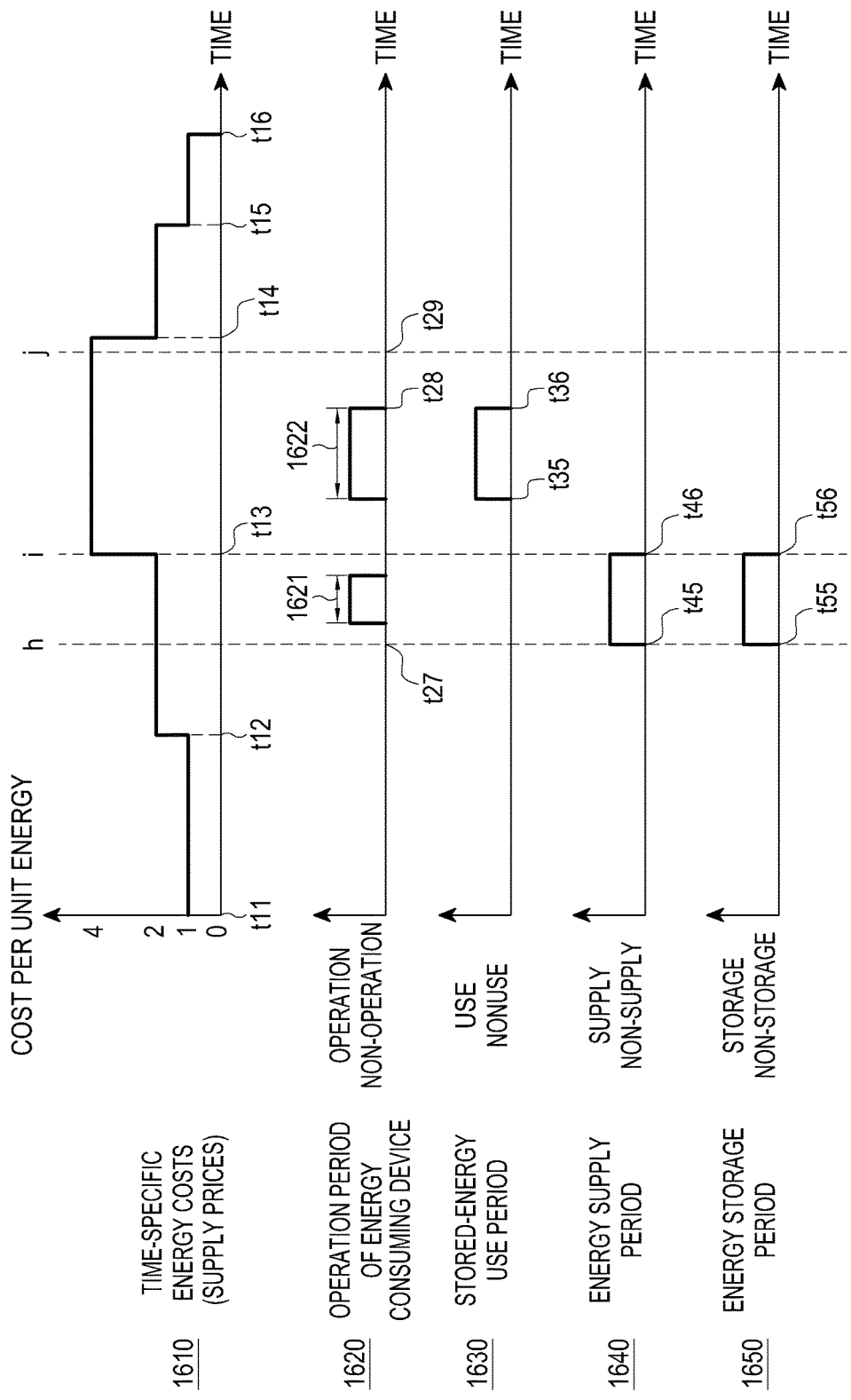
FIG. 16 is a diagram illustrating time-specific energy costs and time periods associated with energy supply schemes according to an exemplary embodiment of the present invention.

FIG. 16 illustrates time-specific energy costs 1610 and time periods associated with energy supply schemes according to an exemplary embodiment of the present invention.

A dashed line h may correspond to a first time representing the time the control device 112 determined the energy demands, i.e., the time the control device 112 received information about the energy demands, or representing the current time. A dashed line j may correspond to a maximum delay time or an arbitrary time required for the completion of an operation of the energy consuming device 118.

An operation time period 1620 may include first and second operation time periods 1621 and 1622. The first and second operation time periods 1621 and 1622 may be discontinuously located on the time axis. For example, the energy consuming device 118 may be an air conditioner or a refrigerator.

If the amount of energy to be used in the energy consuming device 118 is greater than the amount of energy stored in the energy storage 114 in the operation time period 1620, or if it is determined that the amount of stored energy is not sufficient to be supplied to the energy consuming device 118, the control device 112 may search for a time period (i.e., a time period from the dashed line h to a dashed line i) whose energy cost (i.e., cost of 2 per unit energy) is lower than or equal to the energy costs (i.e., costs of 2 and 4 per unit energy) corresponding to the operation time period 1620, in the time period from the dashed line h to the end time t28 of the operation time period 1620. The second operation time period 1622 may be a time period determined by accepting the searched time period from the operation time period 1620. The control device 112 may determine if the searched time period precedes the second operation time period 1622. The control device 112 may also determine if the amount of energy to be used in the energy consuming device 118 during the second operation time period 1622 is greater than the amount of stored energy. If the searched time period precedes the second operation time period 1622 in the operation time period 1620 and the amount of energy to be used in the energy consuming device 118 during the second operation time period 1622 is greater than the amount of stored energy, the control device 112 may control the energy to be supplied from the energy supplier 130 to the energy storage unit 114, by transmitting an energy supply request to the energy supplier 130 in a partial time period included in the searched time period. If the second operation time period 1622 is higher than the first operation time period 1621 in energy cost, the control device 112 may control the energy consuming device 118 to first consume the energy stored in the energy storage 114 in the second operation time period 1622 than the first operation time period 1621. In other words, the control device 112 may control the energy consuming device 118 to first consume the energy stored in the energy storage 114 than the energy supplied from the energy supplier 130 in the second operation time period 1622.

For example, if the amount of energy stored in the energy storage 114 is not sufficient to be supplied to the energy consuming device 118 in the second operation time period 1622, the control device 112 may acquire the amount of energy to be stored in the energy storage 114 in a partial time period included in the search time period from the dashed line h to the dashed line i, and may acquire a time period from t55 to t56 as an energy storage time period 1650. The control device 112 may first acquire, as a stored-energy use time period 1630, a time period from t35 to t36, which is included in the second operation time period 1622 rather than the first operation time period 1621. The amount of energy used in the stored-energy use time period 1630 may include at least one of the amount of energy stored in the energy storage 114 at the time indicated by the dashed line h and the amount of energy to be stored in the energy storage 114 in a partial time period included in the searched time period.

An energy supply time period 1640 where energy is supplied from the energy supplier 130 to the energy storage 114 or the energy consuming device 118 may be acquired in the searched time period. The control device 112 may control the energy to be supplied from the energy supplier 130 to the energy storage 114 or the energy consuming device 118, by transmitting an energy supply request to the energy supplier 130 in the energy supply time period 1640.

The control device 112 may control energy supply by applying the energy supply scheme A 410 in a partial time period included in the second operation time period 1622. The control device 112 may control the energy stored in the energy storage 114 to be first consumed in the second operation time period 1622, and may control the energy left in the second operation time period 1622 to be consumed in a partial time period included in the first operation time period 1621.

Figure 17:
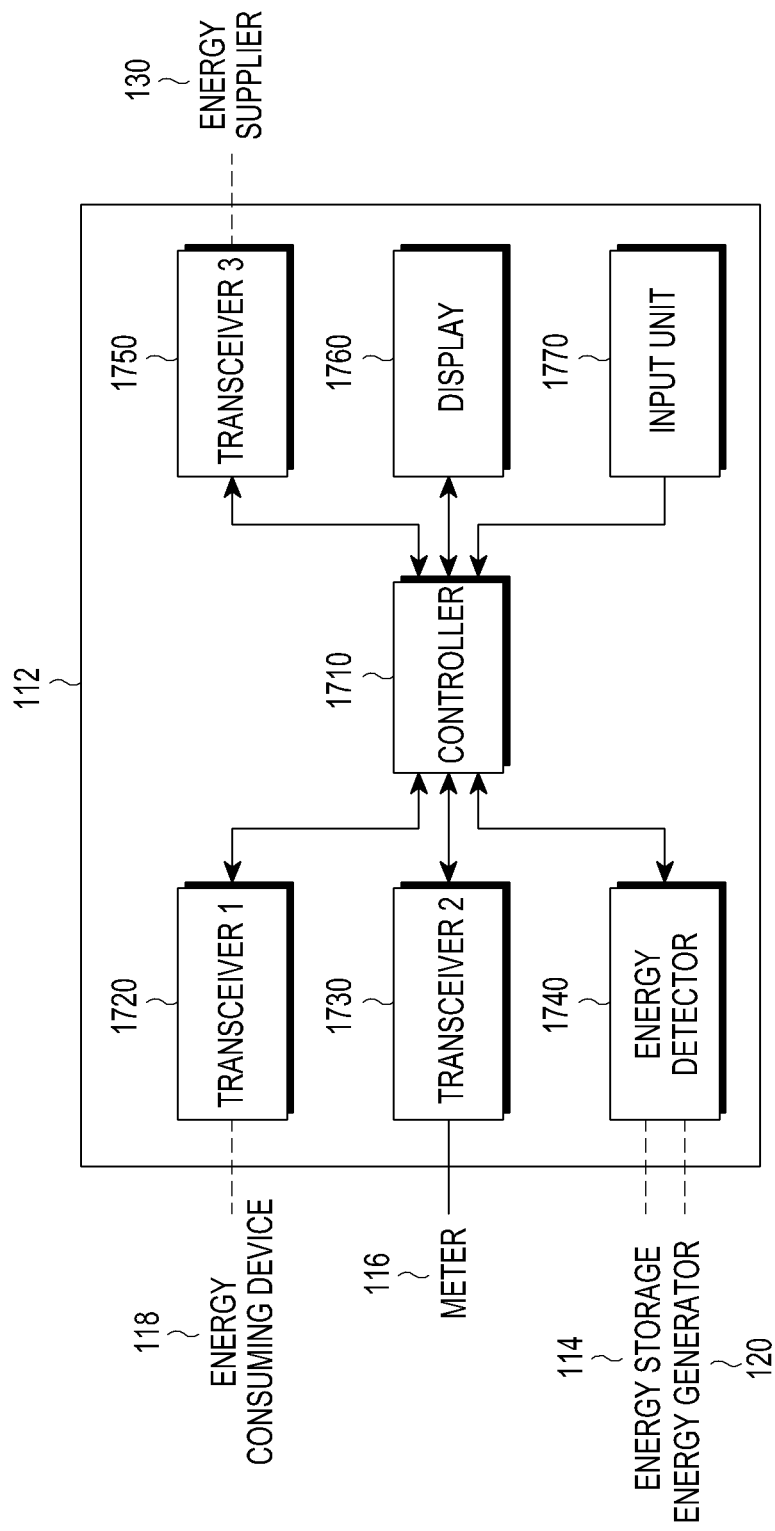
FIG. 17 is a diagram illustrating a structure of an energy supply control apparatus according to an exemplary embodiment of the present invention.

FIG. 17 illustrates a structure of an energy supply control apparatus according to an exemplary embodiment of the present invention.

Referring to FIG. 17, the energy supply control apparatus (i.e., a control device 112) may include an energy detector 1740, a controller 1710, a first transceiver 1720, a second transceiver 1730, a third transceiver 1750, a display 1760, and an input unit 1770.

The first transceiver 1720 may receive energy demand information from the energy consuming device 118. The energy demand information may include at least one of a number of operations of a specific energy consuming device, an operating time thereof, a maximum delay time required for the completion of the operations, and the amount of energy to be used. The first transceiver 1720 may transmit an energy demand information request to the energy consuming device 118.

The energy detector 1740 may determine the amount of energy stored in the energy storage 114. When the first transceiver 1720 receives the energy demand information, the controller 1710 may control the energy detector 1740 to transmit an energy amount request to the energy storage 114 if needed. The controller 1710 may control the energy detector 1740 to periodically transmit an energy amount request to the energy storage 114. By omitting the transmission of an energy amount request, the energy detector 1740 may periodically receive information about the amount of stored energy from the energy storage 114, or may receive information about the amount of stored energy from the energy storage 114 depending on an event that occurs when the amount of stored energy reaches a preset level. The energy detector 1740 may unilaterally detect the amount of energy stored in the energy storage without communication.

The energy detector 1740 may detect the amount of energy generated in the energy generator 120. The controller 1710 may compare accumulated data with the detected amount of generated energy, received from the energy detector 1740, and may acquire the amount of producible energy depending on preset statistics. The controller 1710 may adaptively determine the amount of requested energy by taking into account the amount of producible energy.

The second transceiver 1730 may receive the amount of energy supply/demand, detected by the meter 116. The second transceiver 1730 may receive, from the meter 116, information about the amount of energy consumption for each of energy consuming devices 118, and the time-specific energy costs. The second transceiver 1730 may transmit and receive a signal for controlling the meter 116 to continue or block the flow of energy supplied from the energy supplier 130 and/or energy sold to the energy supplier 130. For example, the second transceiver 1730 may transmit information about the amount of requested energy to the meter 116, and the meter 116 may block the supply of energy when the amount of supplied energy is equal to the amount of requested energy. The second transceiver 1730 may receive information about the amount of supplied/sold energy from the meter 116 in real time.

The controller 1710 may control the third transceiver 1750 to transmit an energy supply request to the energy supplier 130. The third transceiver 1750 may receive the time-specific energy costs from the energy supplier 130.

The controller 1710 may acquire the amount of energy that will be consumed in at least one energy consuming device 118 in a preset time period. The controller 1710 may acquire the amount of energy to be used, by receiving energy demand information for the energy consuming device 118 from the first transceiver 1720 or receiving energy demand information from users through the input unit 1770. The display 1760 may provide a user an interface for receiving energy demand information.

The controller 1710 may also compare the amount of stored energy with the amount of required energy, and determine an energy supply scheme. The controller 1710 may determine at least one of an operation time period of an energy consuming device 118, an energy storage time period, a stored-energy use time period, and an energy supply time period where energy will be supplied from the energy supplier 130.

The controller 1710 may also control the third transceiver 1750 to optionally transmit an energy supply request to the energy supplier 130 based on the amount of energy to be used, and the amount of stored energy. The energy supply request may include information about the amount of requested energy, which is determined based on a preset amount of energy, the amount of energy to be used, and the amount of stored energy.

The input unit 1770 may receive, from users, information about the target amount of energy, indicating the amount of energy required to be stored in the energy storage 114 at specific timing. The display 1760 may provide a user interface for receiving information about the target amount of energy and/or the specific timing. The controller 1710 may control the third transceiver 1750 to optionally transmit an energy supply request to the energy supplier 130 based on the amount of energy to be used, the target amount of energy, and the amount of stored energy.

Figure 18:
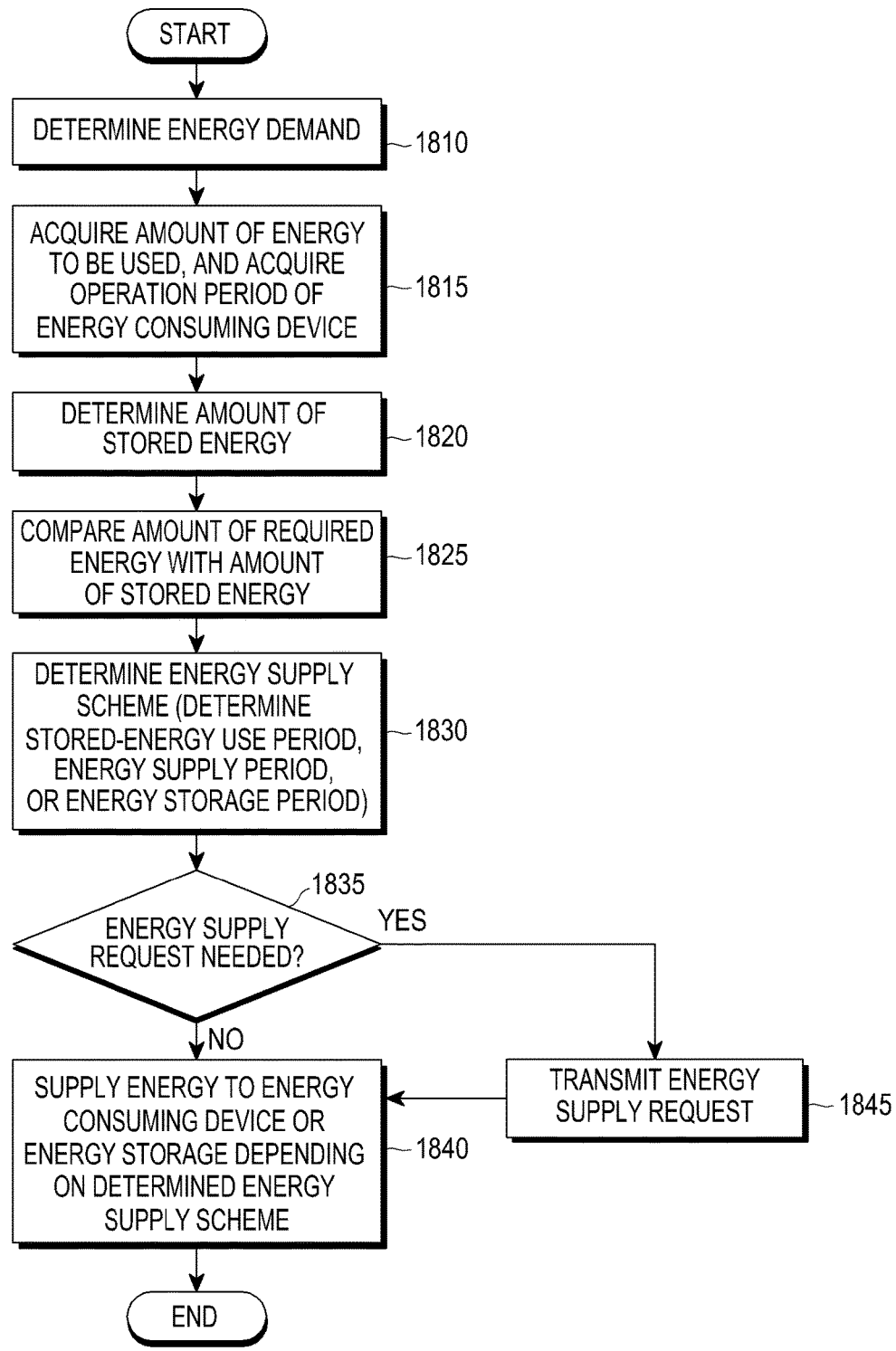
FIG. 18 is a diagram illustrating a process of controlling energy supply according to an exemplary embodiment of the present invention.

FIG. 18 illustrates a process of controlling energy supply according to an exemplary embodiment of the present invention.

Referring to FIG. 18, the control device 112 may determine energy demands based on energy demand information received from the energy consuming device(s) 118 and/or the meter 116 in step 1810. The control device 112 may acquire the amount of energy to be used, based on the energy demand information, and may acquire an operation time period where the energy consuming device 118 operates, based on the time-specific energy costs and the energy demands in step 1815. The control device 112 may determine the amount of stored energy in step 1820. Alternatively, the determining of the amount of stored energy in step 1820 may be performed regardless of the order of steps 1810 and 1815. The control device 112 may compare the amount of required energy with the amount of stored energy in step 1825. At this point, the control device 112 may determine the amount of requested energy. The control device 112 may determine at least one energy supply scheme to be applied to a specific time period or a preset time period in step 1830. The control device 112 may determine a stored-energy use time period, an energy supply time period, and an energy storage time period.

The control device 112 may determine if there is a need to request energy supply, depending on the determined energy supply scheme in step 1835. If there is a need to request energy supply, the control device 112 may transmit an energy supply request to the energy supplier 130 in step 1845. In accordance with the determined energy supply scheme, the control device 112 may supply energy to the energy consuming device 118 and/or the energy storage 114 in step 1840.

As is apparent from the foregoing description, exemplary embodiments of the present invention may optionally transmit an energy supply request to an energy supplier based on the amount of energy to be used and the amount of energy stored in an energy storage, thereby efficiently controlling energy supply.

In the exemplary embodiments of the present invention, an energy supply control system may transmit an energy supply request including information about the amount of requested energy based on at least one of a preset amount of energy, the amount of energy to be used, and the amount of stored energy, may be transmitted, thereby the energy supply can be more accurately controlled.

In the exemplary embodiments of the present invention, in the energy supply system, information about the target amount of energy may be received from a user or may be preset, indicating the amount of energy required to be stored in an energy storage, thereby the energy supply according to the user situation can be more conveniently controlled.

If an operation time period where an energy consuming device operates includes time periods having different energy costs, the exemplary embodiments of the present invention may control the energy stored in an energy storage to be first consumed in a time period having higher energy cost than a time period having lower energy cost, thereby more efficiently supplying energy.

In the exemplary embodiments of the present invention, energy from an energy supplier may be supplied and the supplied energy is stored in an energy storage in a time period having lower energy cost, thereby energy can be more economically supplied.

The above-described exemplary embodiments of the present invention may be implemented in the form of a program command executable by various computer means, and then recorded in a computer-readable medium. The computer-readable medium may include a program command, a data file, a data structure, and the like, individually or in combination. Although the program commands recorded in this medium have been especially designed and configured according to the exemplary embodiments of the present invention, computer software known to those skilled in the art may also available.

While the invention has been illustrated and described with reference to certain exemplary embodiments thereof, it will be understood by those skilled in the art that various changes in form and details may be made therein without departing from the spirit and scope of the invention as defined by the appended claims and their equivalents.

What is claimed is:

1. A computer implemented method for controlling energy supply, the method comprising:
    identifying a first amount of energy to be used by at least one energy consuming device;
    identifying a second amount of energy stored in an energy storage;
    identifying an operation time period for operating the at least one energy consuming device;
    if the first amount of energy is greater than the second amount of energy, calculating a third amount of energy to request energy supply from an energy supplier to the energy storage based on the first amount of energy and the second amount of energy;
    if the first amount of energy is greater than the second amount of energy in the operation time period, searching for a time period which an energy cost is lower than in the operation time period, based on time-specific energy costs; and
    transmitting an energy supply request message to the energy supplier, wherein the energy supply request message comprises information related to the third amount of energy and the partial time period included in the searched time period.

2. The method of claim 1, wherein the first amount of energy is an amount of energy to be used by the at least one energy consuming device in a preset time period.

3. The method of claim 2, wherein the third amount of energy is determined based on the first amount of energy, and information related to the preset time period.

4. The method of claim 3, wherein the third amount of energy is further determined based on at least one of a preset amount of energy, the first amount of energy, and the second amount of energy.

5. The method of claim 4, wherein the third amount of energy is determined to be greater than or equal to a difference between an amount of required energy and the second amount of energy, and the amount of required energy is determined as a sum of the preset amount of energy and the first amount of energy.

6. The method of claim 1, wherein the first amount of energy is a sum of an amount of energy for communication with the at least one energy consuming device and an amount of energy demand for the at least one energy consuming device.

7. The method of claim 1, wherein the transmitting of the energy supply request message comprises:
determining whether to transmit the energy supply request message based on at least one of the first amount of energy, the second amount of energy, and a target amount of energy,
wherein the target amount of energy represents an amount of energy required to be stored in the energy storage.

8. The method of claim 1, further comprising:
controlling the at least one energy consuming device to first consume the energy stored in the energy storage in a second time period if the second time period included in the operation time period is higher than a first time period included in the operation time period in terms of an energy cost.

9. The method of claim 8, wherein the operation time period is identified based on information related to an amount of energy consumption for each energy consuming device, which is received from a meter.

10. An apparatus for controlling energy supply to at least one energy consuming device, the apparatus comprising:
an energy detector configured to identify a second amount of energy stored in an energy storage;
a controller configured to:
identify a first amount of energy to be used by the at least one energy consuming device,
identify an operation time period for operating the at least one energy consuming device,
if the first amount of energy is greater than the second amount of energy, calculate a third amount of energy to request energy supply from an energy supplier to the energy storage based on the first amount of energy and the second amount of energy, and
if the first amount of energy is greater than the second amount of energy in the operation time period, search for a time period which an energy cost is lower than in the operation time period, based on time-specific energy costs; and a transceiver configured to:
transmit an energy supply request message to the energy supplier,
wherein the energy supply request message comprises information related to the third amount of energy and the partial time period included in the searched time period.

11. The apparatus of claim 10, wherein the first amount of energy is an amount of energy to be used by the at least one energy consuming device in a preset time period.

12. The apparatus of claim 11, wherein the third amount of energy is determined based on the first amount of energy, and information related to the preset time period.

13. The apparatus of claim 12, wherein the third amount of energy is further determined based on at least one of a preset amount of energy, the first amount of energy, and the second amount of energy.

14. The apparatus of claim 13, wherein the third amount of energy is determined to be greater than or equal to a difference between an amount of required energy and the second amount of energy, and the amount of required energy is determined as a sum of the preset amount of energy and the first amount of energy.

15. The apparatus of claim 10, wherein the first amount of energy is a sum of an amount of energy for communication with the at least one energy consuming device and an amount of energy demand for the at least one energy consuming device.

16. The apparatus of claim 10,
wherein the controller is further configured to determine whether to transmit the energy supply request message based on at least one of the first amount of energy, the second amount of energy, and a target amount of energy, and
wherein the target amount of energy represents an amount of energy required to be stored in the energy storage.

17. The apparatus of claim 10, wherein, if a second time period included in the operation time period is higher than a first time period included in the operation time period in terms of an energy cost, the controller is further configured to control the at least one energy consuming device to first consume the energy stored in the energy storage in the second time period.

18. The apparatus of claim 17, wherein the operation time period is identified based on information related to an amount of energy consumption for each energy consuming device, which is received from a meter.

19. The method of claim 1, wherein an amount of energy demand includes at least one of an amount of energy, which is identified based on energy demand information received from the at least one energy consuming device, an amount of energy for an energy consuming device incapable of transmitting the energy demand information, and an amount of energy for an energy consuming device that operates nonstop.

20. The method of claim 19, wherein the energy demand information includes at least one of a number of operations of the at least one energy consuming device, an operating time thereof, a maximum delay time required for the completion of the operations, and an amount of energy consumed per hour.

21. The apparatus of claim 10, wherein an amount of energy demand includes at least one of an amount of energy, which is identified based on energy demand information received from the at least one energy consuming device, an amount of energy for an energy consuming device incapable of transmitting the energy demand information, and an amount of energy for an energy consuming device that operates nonstop.

22. The apparatus of claim 21, wherein the energy demand information includes at least one of a number of operations of the at least one energy consuming device, an operating time thereof, a maximum delay time required for the completion of the operations, and an amount of energy consumed per hour.

\* \* \* \* \*